United States Patent

[11] 3,601,570

[72] Inventor Paul K. Davis
        Alameda, Calif.
[21] Appl. No. 646,089
[22] Filed June 14, 1967
[45] Patented Aug. 24, 1971
[73] Assignee Pacific Roller Die Company
        Hayward, Calif.

[54] HELICAL PIPE-FORMING AND WELDING APPARATUS METHOD
    13 Claims, 32 Drawing Figs.

[52] U.S. Cl. ................................................. 219/62,
        219/59, 228/17, 219/67
[51] Int. Cl. ........................................................ B23k 1/16,
        B23k 11/08
[50] Field of Search ........................................ 219/62;
        29/429, 477.3 X, 493 X; 228/49 X, 49, 29; 72/49,
        50 X

[56] References Cited
    UNITED STATES PATENTS
    2,752,873  7/1956  Freeze ........................... 228/49 X
    2,873,353  2/1959  Rudd ............................ 219/62
    3,314,141  4/1967  Bacroix ......................... 29/477.3
    967,260    8/1910  Witzenmann et al. ........ 219/62 X
    3,263,321  8/1966  Lombardi ..................... 219/62 X
    3,358,112  12/1967 Timmers ....................... 219/62 X
    3,093,103  6/1963  Berkeley ....................... 228/17 X
    3,173,594  3/1965  Napier et al. ................. 228/17 X
    3,420,976  1/1969  Morris et al. ................. 219/67
    3,448,235  6/1969  Schmidt ......................... 219/59

FOREIGN PATENTS
    85,787    10/1921  Austria ......................... 219/62

Primary Examiner—J. V. Truhe
Assistant Examiner—Hugh D. Jaeger
Attorney—Boyken, Mohler, Foster & Schwab ABSTRACT: Mechanism and procedure for joining, in the presence of heat and pressure, the abutting edges of a metal strip as it is formed helically into a length of cylindrical pipe. A welding head and pressure rollers are positioned at a joint-forming station to supply heat and pressure in proper amounts to insure formation of a continuous butt-welded seam in an uninterrupted edge-joining operation. The components of the mechanism are adjustable to adapt the mechanism to form pipe of varying sizes.

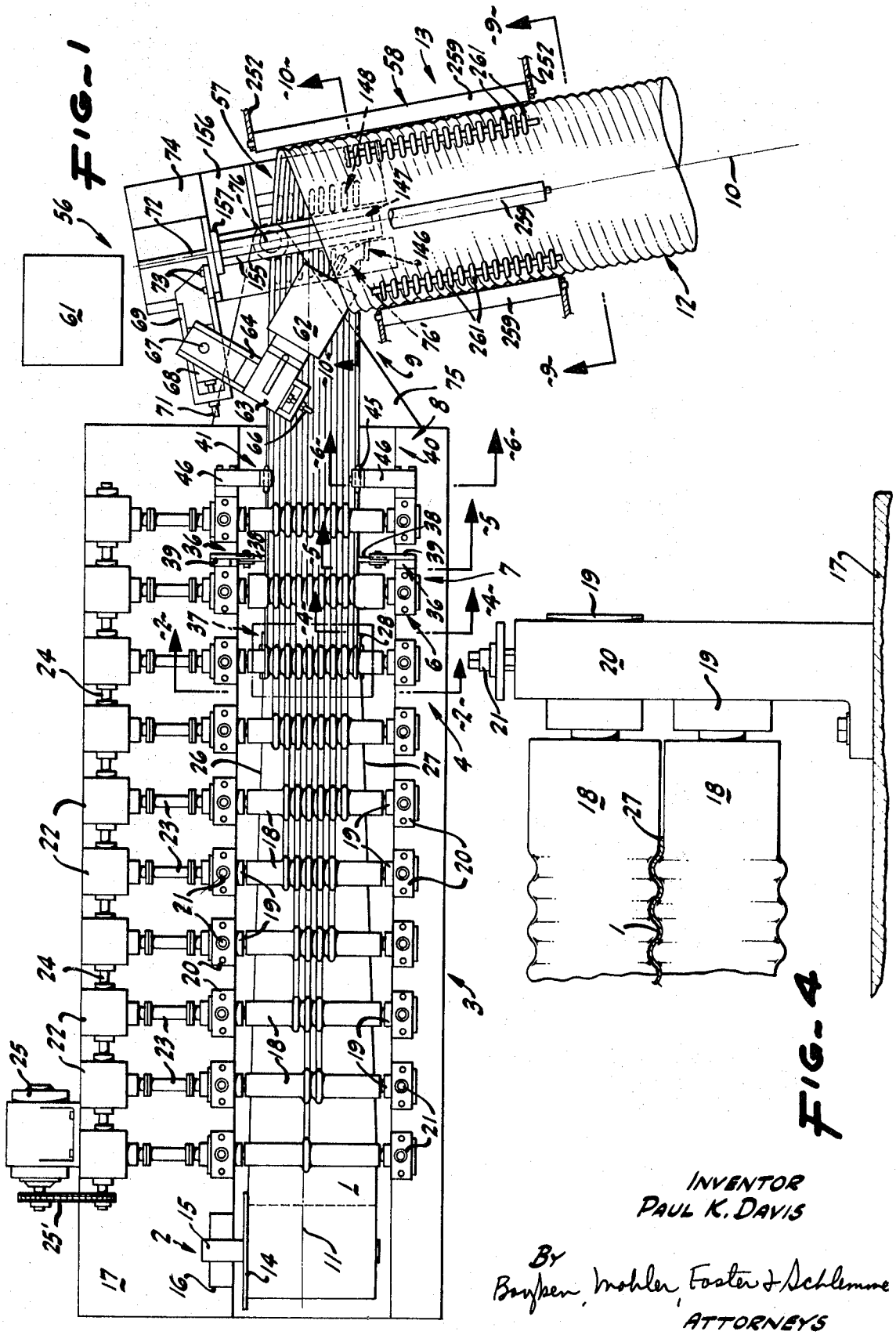

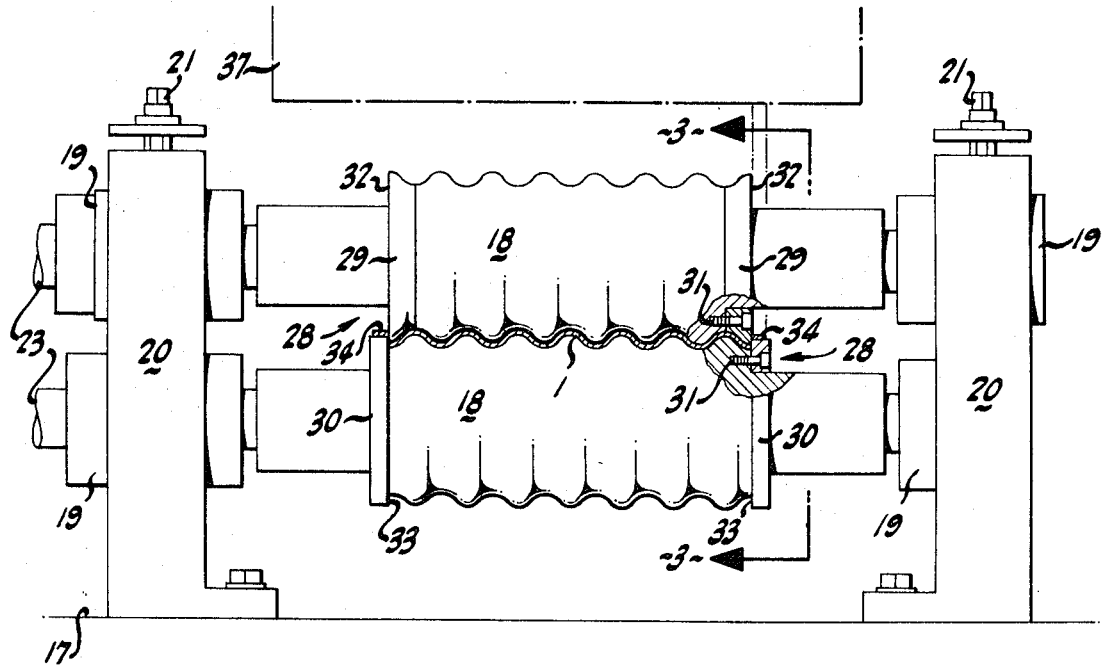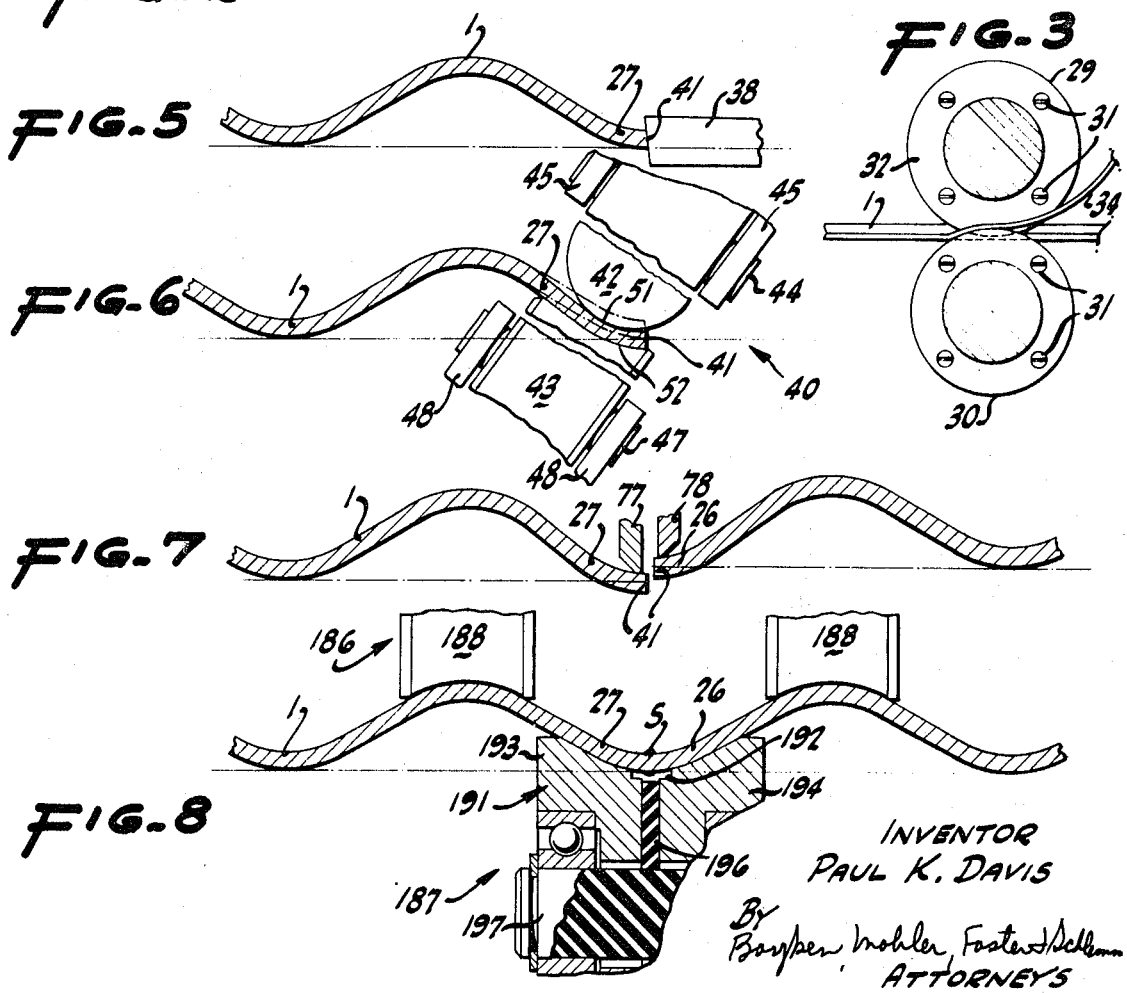

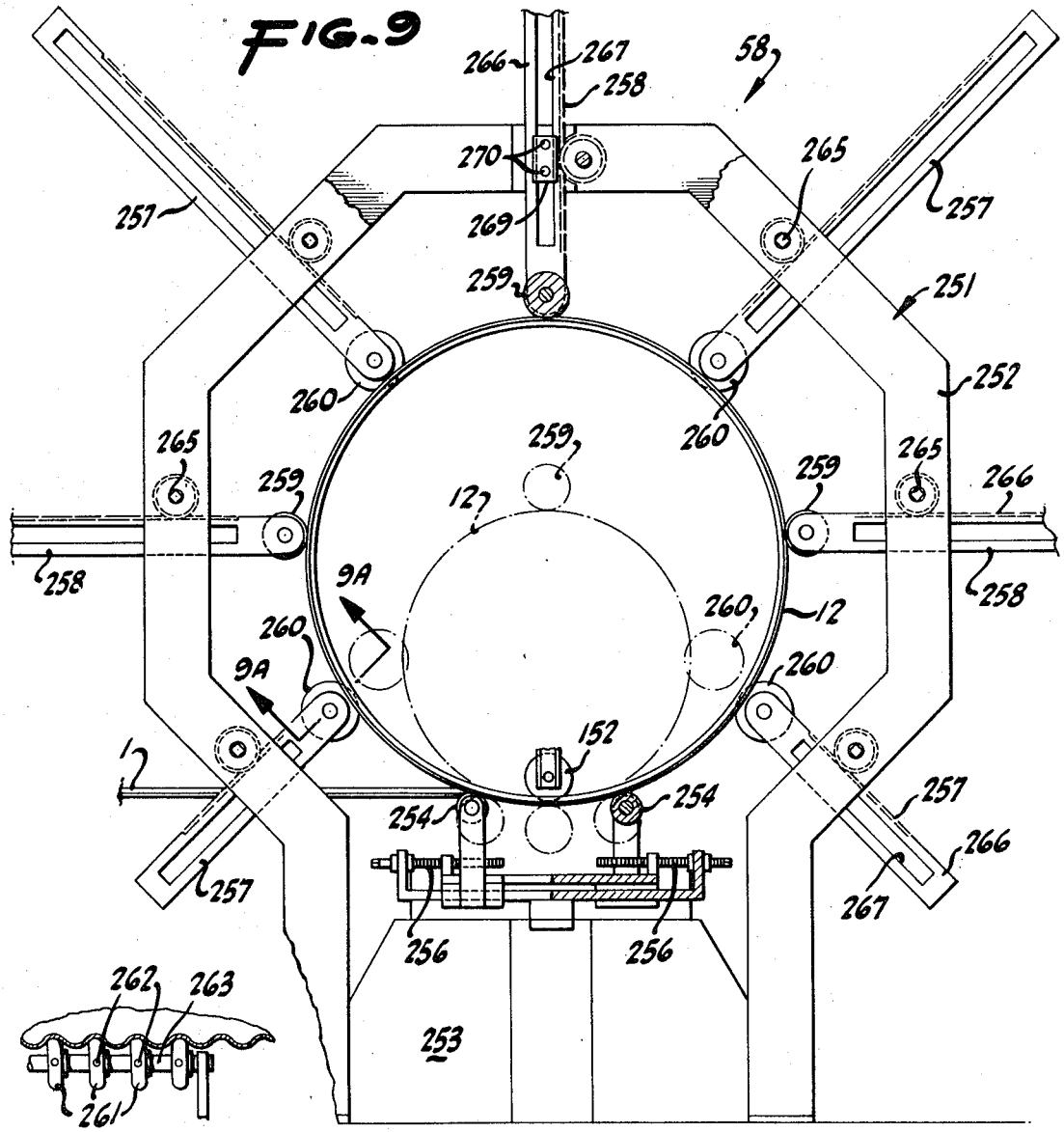
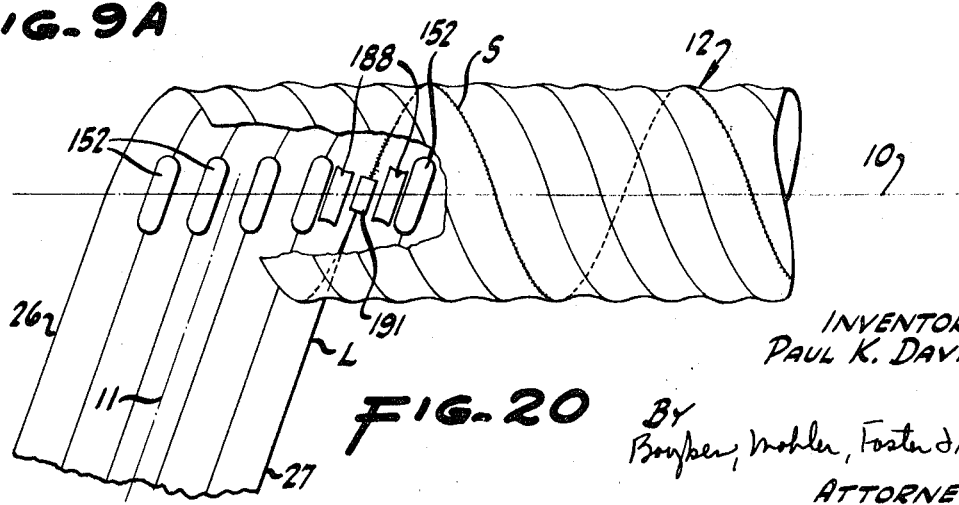

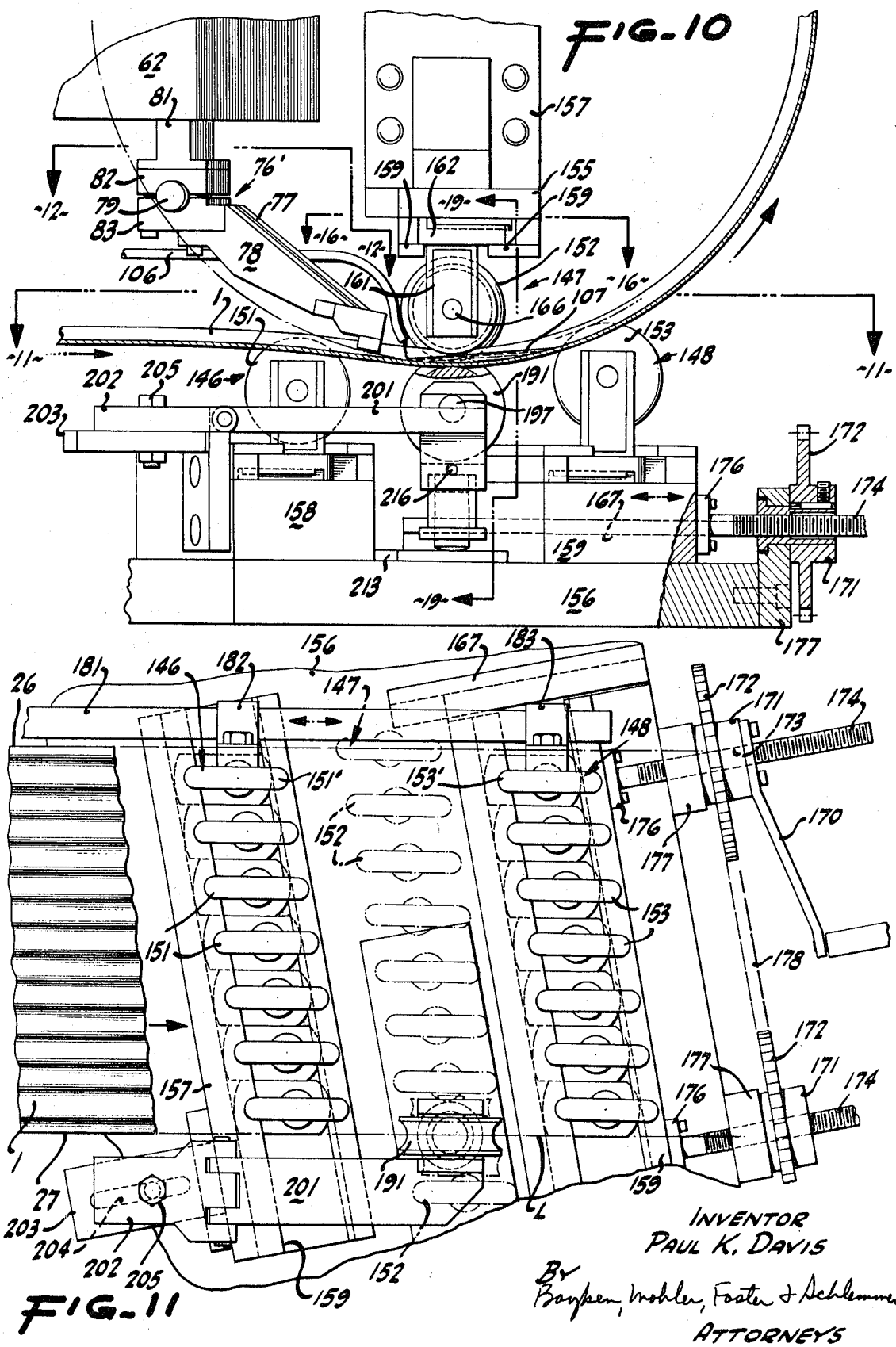

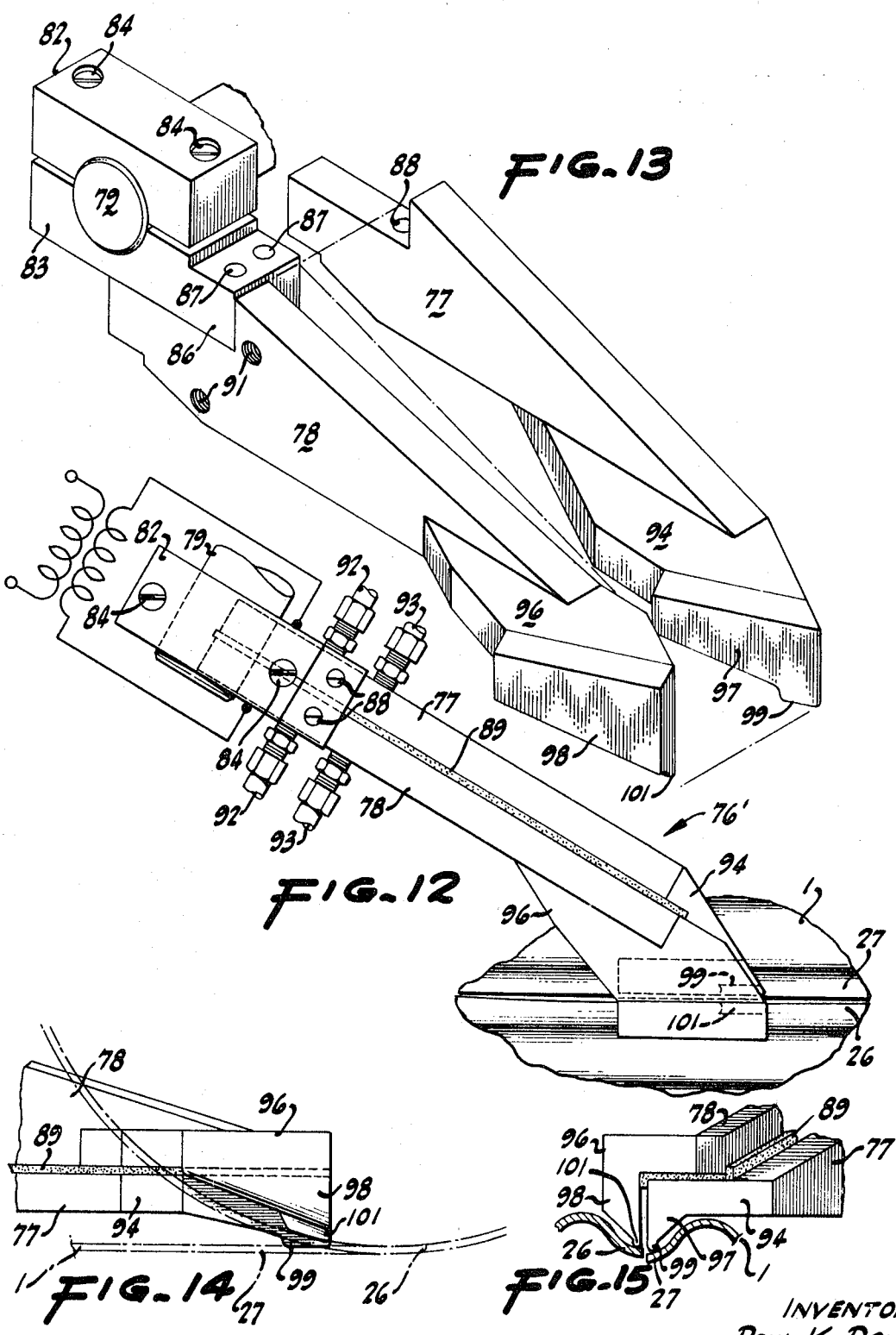

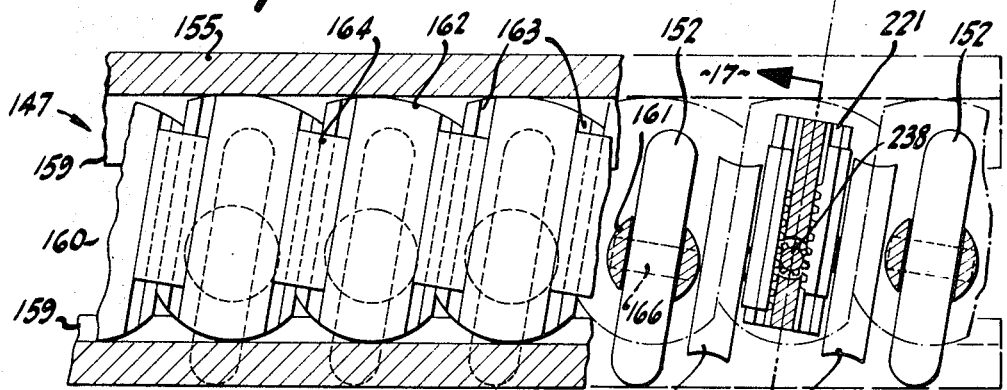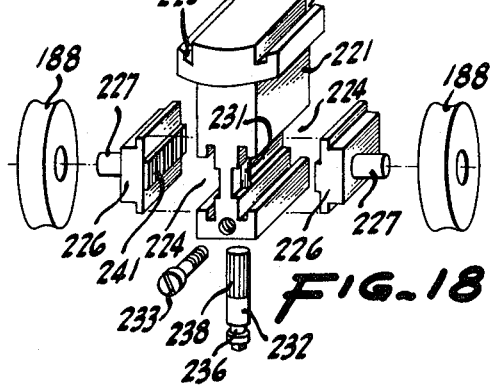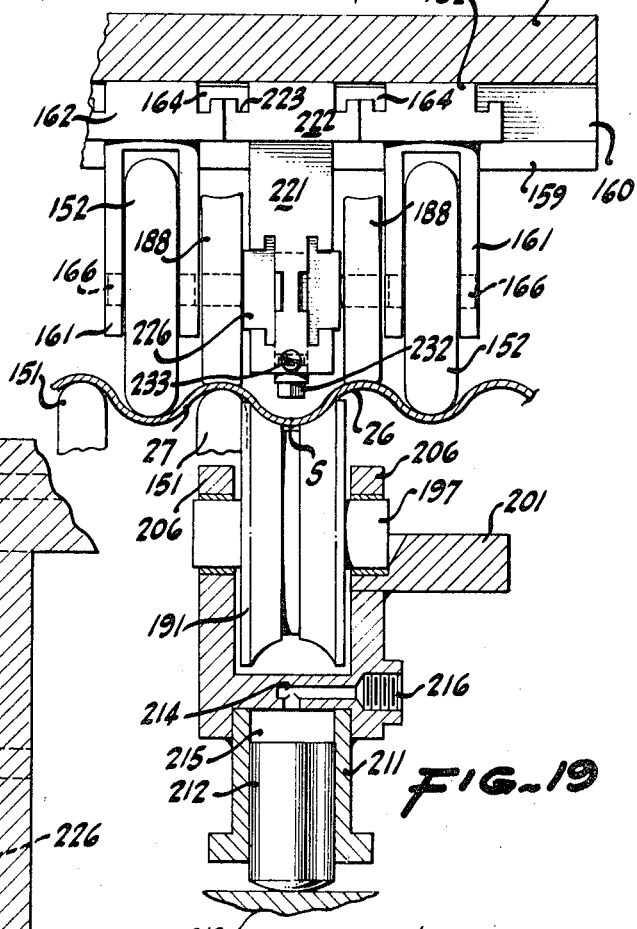

INVENTOR
PAUL K. DAVIS
BY Bosjen, Mohler, Foster & Schlemmer
ATTORNEYS

INVENTOR
PAUL K. DAVIS

BY Bowden, Mohler, Foster & Schlemme
ATTORNEYS

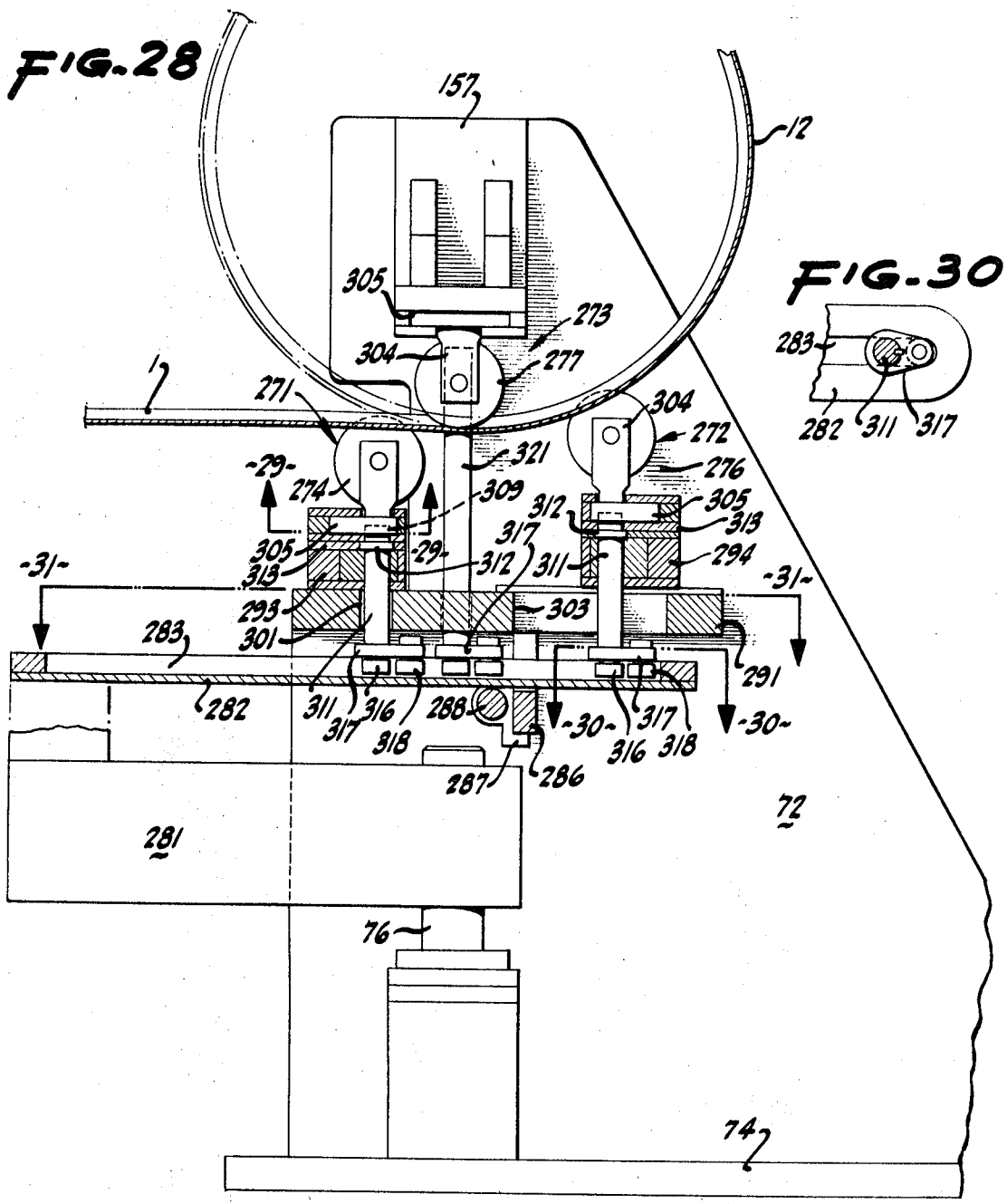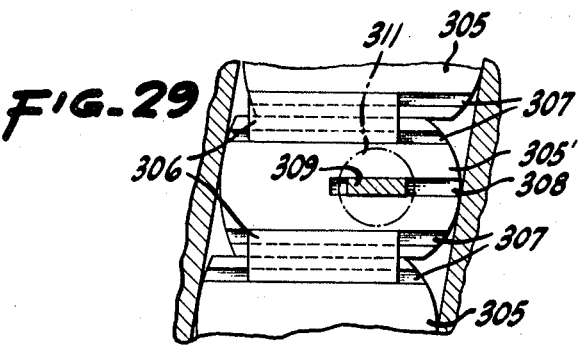

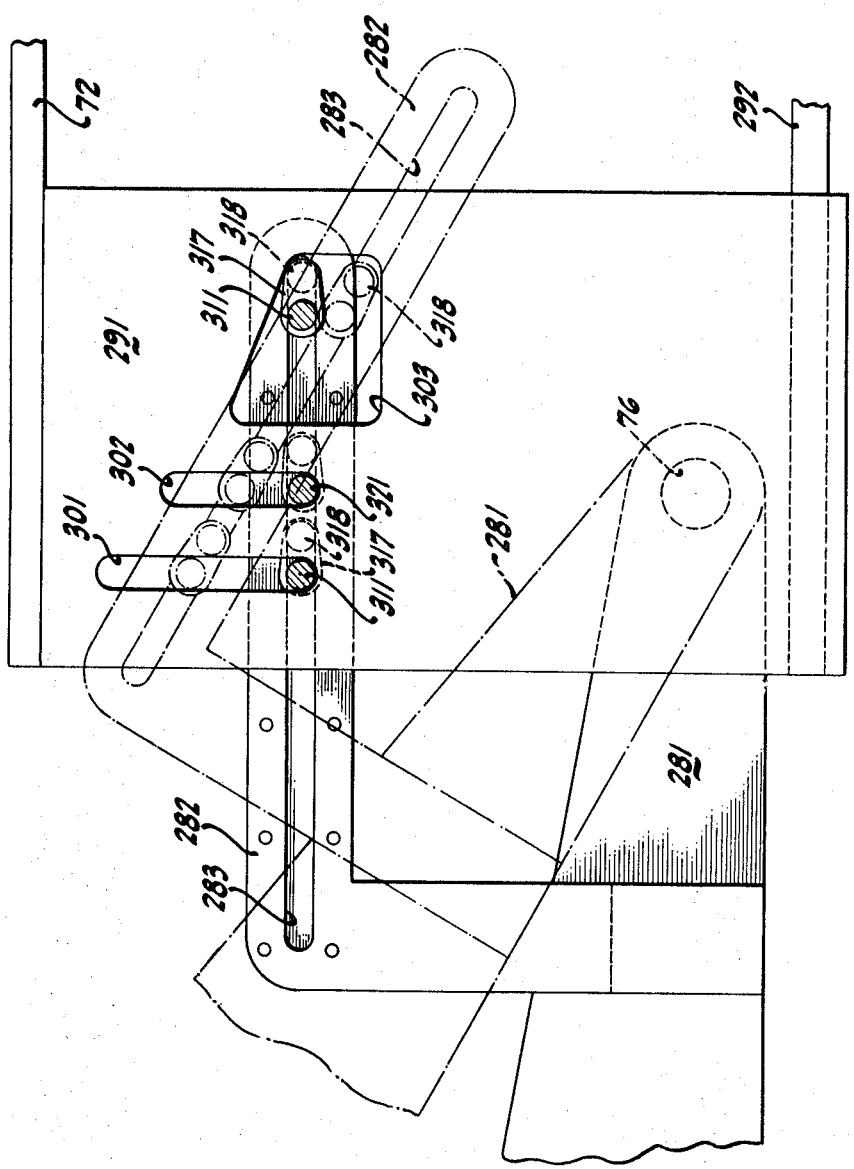

HELICAL PIPE-FORMING AND WELDING APPARATUS METHOD

BACKGROUND OF THE INVENTION

1. Field of the Invention

This invention relates generally to the field of pipe manufacturing. More particularly, this invention relates to an apparatus and a method for transforming a metal strip into a length of pipe having an uninterrupted butt-welded seam extending helically therearound and therealong. This invention also relates to the product which results from utilization of such apparatus and method. This invention has particular utility in the formation of large diameter corrugated pipe.

2. Description of the Prior Art

Apparatus and procedures for transforming a metal strip into large diameter pipe, particularly corrugated pipe well suited for use as culvert pipe, have been known in the art heretofore. One such machine and method is disclosed in Davis U.S. Pat. No. 3,247,692, dated Apr. 26, 1966, entitled "Pipe Making Machine and Method." However, the disclosure of that patent is directed (although not restricted) to the formation of helical pipe having a seam formed therein by bending and interlocking the edges of a metal strip in a lock-type seam as the strip is being formed into a cylindrical contour.

Also, machines and methods have been known generally heretofore for forming helical smooth wall tubing from a metal strip by welding. However, with prior known welding procedures and machines, the size of the tubing has been restricted generally to small diameters and it has been necessary to utilize a fixed-size forming mandrel or shoe into or about which the metal strip is bent during the forming operation and which must be changed for each different size of pipe to be formed.

With the present invention, pipe having a continuous butt-welded seam is produced in a high speed continuous operation without requiring an internal or external shoe as described above. With the present invention pipe diameter size restrictions characteristic of the prior art are overcome.

SUMMARY OF THE INVENTION

This invention relates to an improved procedure for forming metal pipe, particularly large diameter pipe. More specifically, this invention relates to smooth wall or corrugated metal pipe, and to an apparatus and a method for producing the same in a substantially continuous welding operation from an elongated strip of sheet metal by joining one edge of the strip to an abutting opposite edge thereof as the strip is being helically coiled into a generally cylindrical configuration. In this regard, the resulting pipe product is formed with a continuous butt-welded seam which extends in a helical path for the full length of the pipe and in the case of corrugated pipe, in conformity with the corrugations formed in the metal strip prior to the welding operation.

While in its preferred embodiment disclosed herein, the completed pipe has its welded seam formed along the crest of a corrugation, the inventive concepts disclosed herein may be utilized to form the seam at other locations on the corrugations, such as at the base or valley of a corrugation. However, butt welding at the crest as described hereinafter is preferable under most circumstances.

It is also preferred that this invention be employed in a continuous operation in which a flat sheet metal strip is first transformed into a corrugated strip having a series of uniform, parallel ridges and valleys extending longitudinally therealong. Following suitable edge treatment of the corrugated strip, the strip is carried past a welding station at which the strip is helically coiled into a generally cylindrical pipe configuration and its opposite edges are joined together thereat in a continuous butt-type weld seam. Following welding, the length of continuous pipe thus formed is transferred from the welding station for severing by a suitable device into discrete sections of pipe of predetermined lengths.

It should be understood also that this apparatus and method are employable in the formation of pipe of varying diameters from the same width sheet strip. As will be brought out hereinafter, the apparatus is adjustable to permit formation of a large variety of pipe sizes from a single width sheet. In this connection, while the exact material employed in the pipe formation may vary, so long as such material is weldable, it may be employed with this method. Frequently, however, and normally, culvert pipe of the type specifically disclosed herein is formed from galvanized steel sheet, the thickness of which varies in accordance with the strength required for the diameter of pipe being formed.

From the foregoing, it should be understood that objects of this invention, among others, include: the provision of a helically corrugated metal pipe having a continuous butt-welded seam extending helically along the length thereof; the provision of an apparatus and method for forming a welded pipe in a continuous operation; the provision of a method and apparatus which transforms a strip of sheet metal into a helical pipe having a continuous butt-welded seam extending the length thereof; the provision in such an apparatus of improved means for conditioning the edges of the metal strip from which the pipe is formed to adapt the same for a continuous butt-welding operation; the provision is a pipe-welding apparatus of means for applying pressure to the edges being butt-welded together; the provision of improved welding contacts employed in conjunction with the welding head of a pipe-welding apparatus; the provision in such an apparatus of means for properly aligning the contacting edges of a metal strip to be welded into a continuous helically formed pipe; the provision of guide or support means in such an apparatus for accurately maintaining the position of the pipe during welding thereof; and the provision of means in a pipe-welding apparatus adapting such apparatus to form pipe of varying diameters upon proper adjustment of such means.

These and other objects will become apparent from the following detailed description of preferred embodiments of this invention illustrated in the attached drawings to which reference is now directed.

DESCRIPTION OF THE DRAWINGS

FIG. 1 is a top plan view of the apparatus of this invention;

FIG. 2 is a vertical sectional view taken at the strip-edge-trimming station of the apparatus in the plane of line 2—2 of FIG. 1;

FIG. 3 is a vertical sectional view taken in the plane of line 3—3 of FIG. 2;

FIG. 4 is a partial vertical sectional view taken at the strip-edge-flattening station of the apparatus in the plane of line 4—4 of FIG. 1;

FIGS. 5 and 6 are partial vertical sectional views taken respectively in the planes of lines 5—5 and 6—6 of FIG. 1 at the strip-edge-beveling and deforming stations, showing details of mechanisms which treat the opposite edges of the strip preparatory to welding such edges together;

FIGS. 7 and 8 are partial vertical sectional views taken at the forming and welding station which illustrate the application of heat and pressure to the opposite strip edges after the strip has been coiled into a helical pipe configuration. Such figures show the condition of the strip edges just prior to, and during, the welding operation;

FIG. 9 is a vertical sectional view taken in the plane of line 9—9 of FIG. 1 illustrating details of the guide means for supporting the pipe during welding thereof and at a runout station prior to severing the pipe into discrete sections;

FIG. 9A is a partial sectional view taken in the plane of line 9A—9A of FIG. 9 showing details of a guide roller which forms part of such guide means;

FIG. 10 is a vertical sectional view taken in the plane of line 10—10 of FIG. 1 illustrating details of the pipe-forming and welding mechanism provided at the forming and welding station;

FIG. 11 is a plan view taken generally in the plane of line 11—11 of FIG. 10 showing details of one embodiment of the pipe-forming mechanism and the adjustable mounting arrangement therefor.

FIG. 12 is a plan view of one embodiment of the welding head contacts of the welding mechanism taken in the plane of line 12—12 of FIG. 10;

FIG. 13 is an isometric exploded view of the welding head contacts of FIG. 12, shown approximately half actual size in such figure;

FIGS. 14 and 15 are side and end elevational views, respectively, showing the welding head contacts of FIG. 12 and their positions relative to the strip during the welding operation;

FIG. 16 is a horizontal sectional view, partially cut away, taken generally in the plane of line 16—16 of FIG. 10 showing details of one embodiment of the pipe-forming mechanism and the top pressure means which forms part thereof;

FIG. 17 is a vertical sectional view through such top pressure means taken in the plane of line 17—17 of FIG. 16;

FIG. 18 is an exploded view, on a reduced scale relating to FIG. 17, showing details of construction of such top pressure means;

FIG. 19 is an elevational view, partly in section, taken in the plane of line 19—19 of FIG. 10, illustrating details of the top pressure means and one embodiment of the bottom pressure means employed at the welding station, and the cooperation existing therebetween during a welding operation;

FIG. 20 is a diagrammatic view of the sequence of transformation of a corrugated sheet into a corrugated pipe;

FIG. 28 is a side elevational view, partly in section, of the modified embodiment of the mechanism shown in FIG. 27. The welding head contacts have been omitted for purposes of clarity of illustration;

FIGS. 29 and 30 are partial horizontal sectional views through the modified embodiment of the mechanism taken in the planes of lines 29—29 and 30—30, respectively, of FIG. 28;

FIG. 31 is a horizontal sectional view through the modified embodiment of the mechanism taken in the plane of line 31—31 of FIG. 28 showing the adjustable mounting arrangement therefor.

DESCRIPTION OF THE PREFERRED EMBODIMENTS

Figure 21:
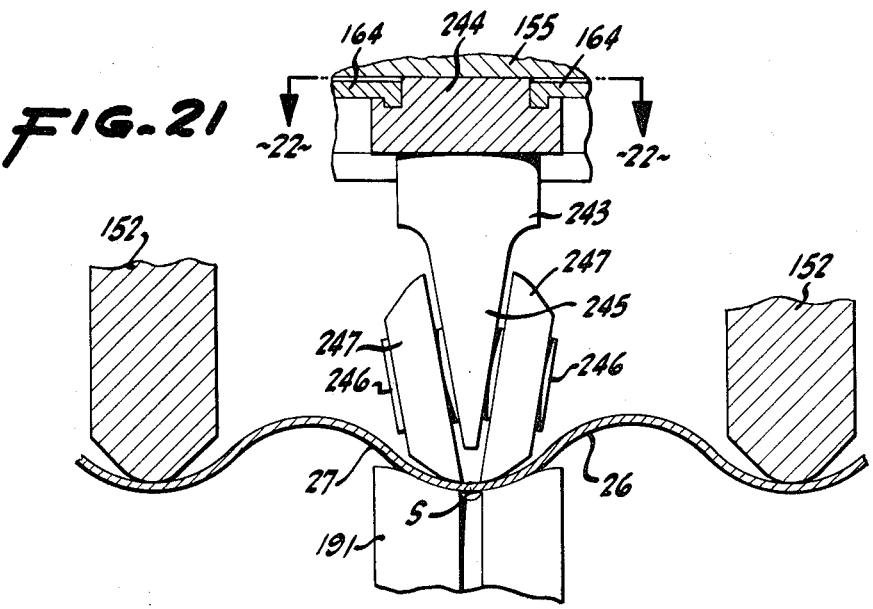
FIG. 21 is an elevational view of a modified embodiment of the top pressure means of FIG. 19.

By way of summary, one embodiment of the continuous pipe-manufacturing procedure of this invention will be briefly described with respect to forming corrugated pipe and the overall showing of FIG. 1. A strip, designated 1, of flat sheet metal, of galvanized steel or other suitable material depending upon the intended use for the pipe being formed, is withdrawn from a coil at a supply station, designated 2. The metal strip is progressively transformed at a corrugating station, designated 3, into a corrugated sheet having a series of uniform ridges and valleys of equal size which extend longitudinally of the strip parallel to each other across the full width of the strip.

At an edge-trimming station, designated 4, opposite longitudinal edges of the corrugated strip are trimmed, thereby forming the strip to the exact width desired. Thereafter, the trimmed strip edges are conditioned for welding at a flattening station, designated 6, following which such flattened edges are inwardly beveled and selectively deformed at beveling and deforming stations, designated 7 and 8, respectively. The corrugated and edge-conditioned strip is then carried past a forming and welding station, generally designated 9, at which the strip is coiled into helical convolutions and the opposite edges of the strip are abutted and joined together in a continuous butt-welded seam to form a continuous length of pipe.

As should be apparent from FIG. 1, the pipe thus formed moves away from the forming and welding station 9 at a predetermined angle, defined by the axis 10 of the completed pipe, relative to the axis 11 of the strip as the strip approaches such station. See FIG. 20 also. The angle between the pipe axis 10 and the strip axis 11 varies in accordance with the diameter of the pipe being formed, in known fashion.

The completed pipe 12 is supported at a runout station, generally designated 13, prior to passing a cutoff station (not shown) adjacent the runout station at which the pipe is severed into discrete sections of predetermined length. Pipe support adjacent forming and welding station 9 and at the runout station 13 is provided by a series of adjustable supporting and guiding rollers, all of which are selectively movable relative to the axis 10 of the pipe formed to permit handling of the pipe having a wide variance in diameters.

In general respects, those portions of the apparatus disclosed herein which form corrugations in the strip 1 and curl the corrugated strip into helical convolutions correspond to similar portions of the apparatus disclosed in aforementioned Davis U.S. Pat. No. 3,247,692. For a fuller understanding of the concept of corrugating metal strip and helically coiling the same so that the opposite edges thereof may be joined directly together, reference is directed to the Davis patent and only a brief description thereof will be made herein. As seen herein in FIG. 1, at the supply station 2, the strip of sheet metal 1 is supported in coil form on a conventional reel, designated 14, which, in turn, is supported on a mounting shaft 15 projecting laterally from a suitable upright standard 16 extending upright at one end of the supporting carriage or base 17 of the apparatus.

The strip is withdrawn from the coil and is carried between a series of successive pairs of driven corrugating rolls 18 which are spacedly mounted along the carriage and extend transversely thereabove. The respective corrugating rolls are arranged in a plurality of stands or matched pairs, as noted in FIG. 4 for example, and extend normal to the axis of the strip. The rolls 18 are supported at opposite ends thereof in suitable bearings 19 provided in a series of spaced upright standards 20 suitably secured by bolting or the like to the carriage 17 of the apparatus. Pressure-adjusting mechanism of known type, generally designated 21 in FIGS. 1 and 4, is provided in conjunction with each stand of corrugating rolls to permit adjustment of the spacing therebetween and the pressure applied thereby to the strip passing therebetween.

Each pair of corrugating rolls is actuated by an associated gear box 22 (FIG. 1). The respective gear boxes 22 are operatively connected with the respective stands of corrugating rolls by means of a series of connecting shafts 23. The successive gear boxes are operatively coupled together by a series of interconnecting drive shafts 24 so that all the corrugating rolls 18 may be driven in unison, preferably from a common drive source, such as electrical motor 25 coupled by a suitable drive pulley arrangement 25' to the first gear box in the train, as seen at the left in FIG. 1. Thus all corrugating rolls may be driven simultaneously and in unison at the same predetermined adjustable speed from such common power source.

As noted from FIG. 1, corrugations are formed in the metal strip in succession with each stand of corrugating rolls adding another corrugation in the strip to those formed previously. In the embodiment illustrated, the strip is formed with seven parallel longitudinally extending corrugations of uniform dimension, but it should be understood that the number of corrugations formed in the strip may be varied as desired or required to meet a particular need.

After the desired number of corrugations has been formed in the strip, the opposite longitudinal marginal edge portions 26 and 27 of the strip are treated in a successive series of operations to prepare the same for the welding operation. To this end, each of the strip edge portions is trimmed at trimming station 4 to reduce the overall width of the strip to an exact predetermined size and to insure a parallel relationship between the opposite outer edge surfaces of the strip.

As seen in FIG. 2, the edge-trimming mechanism, generally designated 28, is provided in conjunction with the stand of corrugating rolls 18 positioned at the trimming station. Such trimming mechanism, in the preferred embodiment illustrated, comprises cooperable upper and lower circular trimming knives 29 and 30 secured by suitable screw fasteners 31 to each of the opposite ends of the respective upper and lower corrugating rolls as integral extensions thereof, as seen in FIGS. 2 and 3. The upper and lower knives have circular peripheral cutting edges which cooperate with each other in severing a marginal edge portion from each side edge of the corrugated strip.

Each of the upper knives 29 is mounted inboard of its associated lower knife 30 so that the cutting edges thereof are arranged in close proximity to each other while permitting relative rotary movement therebetween in overlapped fashion, as seen in FIG. 2. The cutting face of each knife 29, designated 32, is outwardly oriented while the cutting face of each knife 30, designated 33, is inwardly oriented. Thus, when the corrugated strip moves between the rolls at the edge-trimming station, a narrow continuous marginal band 34 of metal is severed from each of the opposite marginal portions of the strip to thereby trim the strip to the exact size desired. It should be noted that the edge-trimming operation results in the strip being provided with generally planar edge surfaces extending generally normal to the original plane of the strip which edges may be subsequently and selectively modified in contour at a following station of the apparatus, as will be described.

Because the edge-trimming operation is a continuous operation which does not require any delay in the travel of the strip through the apparatus, it is necessary to dispose of the two narrow bands of material 34 which have been severed from opposite margins of the strip so that they will not become fouled in the machinery or otherwise interrupt the pipe-forming operation. Various procedures may be employed to dispose of such narrow bands of waste material. For example, the bands may merely be pulled away from the machine from opposite sides thereof to a suitable waste bin by workmen. However, mechanical means for disposing of the bands is preferred. To this end, chopping mechanism is preferably provided in conjunction with the apparatus which severs the narrow bands into short sections for more ready handling and disposal.

Such a chopping mechanism is not shown or described in detail in that any one of several conventional apparatuses presently available on the market may be used. However, one such chopping mechanism has been illustrated schematically in phantom lines in FIGS. 1 and 2 and is designated therein by reference numeral 37. Preferably the chopping mechanism is mounted overhead at the edge-trimming station and the bands of waste material are fed thereto in the upward direction as seen in FIG. 3. During the initial pass of the leading end of a metal strip through the apparatus, it is necessary to manually feed the leading ends of the waste bands 34 into the chopping mechanism, but the chopping mechanism employed is capable thereafter of pulling each of the waste bands into it automatically. The chopping mechanism may have a hopper in conjunction therewith for retaining large quantities of cut-up waste material therein, or, if desired, a chute may be provided in conjunction with the chopping mechanism which will receive waste pieces of material and discharge the same at a location adjacent the apparatus so that disposal thereof may be effected as desired.

The strip-edge-conditioning operations described hereinafter are important to insure that the strip edge surfaces may be properly oriented relative to each other when brought into abutting relationship to complete a corrugation therebetween when the edges are joined together. The welded pipe seam defined by the opposite strip edges in the illustrated embodiment is formed at the crest of a corrugation when the pipe is viewed from its exterior. Note FIGS. 20 and 23. The edges are trimmed, as seen in FIG. 2, so that the strip terminates along each of its edges within a base or valley of a corrugation. Thus, when the strip is coiled into a helical pipe at the welding station, such edges contact each other and together define the crest of the corrugation when the completed pipe is viewed in plan.

It should be understood, however, that the weld seam could also be formed in the valley of a corrugation in the completed pipe if the pipe forming procedure disclosed hereinafter were inverted. Such alternative is considered within the scope of this invention and could readily be effected.

Following edge trimming at station 4, the strip is carried past edge-flattening station 6, as seen in FIG. 4, at which smooth outer cylindrical portions of the rolls 18 insure that the marginal edge portions of the strip are flat and generally parallel to the original plane of strip 1 to prepare them for beveling at station 7. At beveling station 7, the edge surfaces of strip edge portions 26 and 27 are inwardly beveled by a cutting tool to impart an inward and upward taper thereto, as seen in FIG. 5. An edge-beveling device, designated 36 in FIG. 1, is adjustably positioned at each side of the apparatus. Each such device comprises a cutting tool or knife 38 which, as seen in FIG. 1, is supported by a mounting bracket 39 in adjustable fashion so that the knife carried thereby may be moved inwardly and outwardly into selective and precise engagement with the respective edge surface of the strip being carried therepast. The mounting bracket 39, in turn, is secured to an associated upright standard 20 in any suitable fashion.

As seen in FIG. 5, each cutting knife scarfs or cuts away the marginal edge portions 26 and 27 of the strip to provide the same with a slight inwardly beveled edge surface, designated 41, forming an acute angle with respect to the original plane of strip 1 (FIG. 5). The opposite beveled edge surfaces 41 are important to facilitate and assist in the formation of a uniform butt-welded seam as will be described.

Following edge beveling, the strip passes edge-deforming station 8 at which the marginal edge portions 26 and 27 are selectively contoured to insure proper and precise cooperable positioning of the edge portions during welding. In this regard, as seen in FIG. 6, the respective edge portions are deformed slightly downwardly out of the plane of the corrugated strip while at the same time the outermost sector of the edge portions is deformed slightly upwardly. This deformation reorients the edge surfaces 41 back to the normal, with respect to the original plane of the strip (FIG. 6), and spaced slightly inwardly of their original positions so that they are horizontally spaced when brought into opposing relation just prior to welding (FIG. 7). The edge portions are thus deformed to take the same slightly out of the regular corrugated contour of the strip and the effect of the deformation is to slightly narrow the width of strip 1 between edges 41.

As seen in FIGS. 1 and 6, edge-deforming mechanism, designated 40, is mounted adjacent each of the opposite edge portions of the strip and takes the form of a pair of cooperable upper and lower rollers, designated 42 and 43, respectively. Upper roller 42 is supported on a shaft 44 which extends generally parallel to the plane of the contour of the edge corrugation of the strip. Shaft 44 is supported in spaced arms 45 of a mounting bracket which, in turn, is supported by a mounting arm 46 (FIG. 1) secured adjustably to an associated upright standard 20 of the apparatus. The lower deforming roller 43 is similarly mounted for rotation on a shaft 47 which, in turn, is supported in the spaced arms 48 of another mounting bracket which, in turn, is supported by and adjustably secured to standard 20.

It will be noted from FIG. 6 that the respective edge-deforming rollers 42 and 43 are cooperably contoured to effect deformation of the marginal edge portions of the strip as described above. That is, upper roller 42 has a convex peripheral surface which generally matches the contour of the strip corrugations, while lower roller 43 has an irregular concave contour which imparts the desired edge deformation to the strip. In this regard, the convex bearing surface of roller 42 is designated 51 while the concave bearing surface of roller 43 is designated 52.

After the edge portions of the strip have been selectively conditioned as described, the strip passes to the pipe-forming and welding station 9 at which the same is helically coiled and welded into a continuous length of pipe, as seen in FIGS. 1 and 20.

Welding mechanism, generally designated 56, and pipe-forming mechanism, generally designated 57, are provided at station 9, and pipe-supporting mechanism, generally designated 58, is provided adjacent thereto at runout station 13, all as seen in FIG. 1. Each of these mechanisms will be described separately.

While certain components of welding mechanism 56 are commercially available, the welding mechanism in its entirety as preferably employed with this apparatus has been specifically designed to meet the unique requirements imposed thereon by the particular nature of the product being welded and its method of formation. In this connection, the welding mechanism preferably employed is of the high frequency resistance type which utilizes the heat generated by a high frequency current flow to soften the strip to permit the formation of a forge-type weld upon application of pressure independently of and without the requirement for the addition of material to produce the weld seam. It should be understood, however, that so long as proper pressure-applying mechanism is provided in conjunction with the welding mechanism that the nature of the source of welding heat may vary. For example, alternate forms of welding equipment may include low frequency resistance, plasma arc, electron beam, inert gas or submerged arc, or other heating equipment or systems.

In this regard, if high frequency equipment is employed, the same preferably is chosen which can generate frequencies in the range of 300,000 to 500,000 cycles to produce heating to the extent necessary for effective welding to produce a uniform forge-type butt-welded joint. A frequency of the nature of 450,000 cycles has been found generally acceptable for most operating conditions and materials.

The high frequency current is applied to the strip 1 being welded by means of direct-welding contacts, to be described, which have been specifically designed for use with this apparatus and which form an important part thereof. As will be noted, the contacts themselves are relatively small and may be applied to the work being welded with relatively light pressure so that the metal strip may pass in contact therewith with minimal frictional drag. The contact surfaces of the welding contacts are contoured to further minimize such drag and to preclude buildup of foreign material thereon, such as zinc if galvanized steel is being treated.

The welding mechanism shown comprises a high frequency generator, generally designated 61 in FIG. 1, of the type available from various sources, such as the Thermatool Corporation of New Rochelle, New York. The generator, in turn, is operatively connected via suitable electrical cables with the welding head unit 62 positioned adjacent and generally above the location at which the welded joint is being formed. The cable connections between the generator and the welding head are standard commercially available connections and have been omitted from the drawings. The welding equipment, with the exception of the specially designed welding contacts disclosed hereinafter, employed in the welding head unit 62 similarly may be obtainable from various sources, of which the Thermatool Corporation is one.

While the welding head generator and associated devices may be obtained from commercial sources, their effectiveness in the present invention requires adaptation and modification thereof before the same may be employed as an integral part of this invention. It is such adaptation and modification which has permitted the first known continuous helical pipe butt-welding operation to be effected on a commercial scale by employing the subject apparatus and method. In this connection, commercial pipe production speeds of 100 lineal feet of strip or weld length per minute are obtainable.

The welding head 62 and the specially devised welding contacts employed therewith are mounted for substantially universal adjustment so that the welding contacts may be properly and accurately positioned with respect to the strip edges to be welded together. Thus, varying strip widths and thicknesses may be accommodated and pipes of varying diameters may be formed by the subject apparatus. To this end, welding head 62 is fixedly mounted on a mounting plate 63 (FIG. 1) which, in turn, is slidably secured in a mounting bracket 64 for in-and-out movement relative to a reference location by means of an adjusting turnscrew 66 extending through bracket 64 and secured with the plate 63 in known fashion. At its other end, plate 63 is pivotally secured by means of an upright pivot shaft 67 to a second mounting plate 68 which also is slidably retained in a second mounting bracket 69 for in-and-out movement therein by means of an adjusting turnscrew 71 extending through bracket 69 and secured to the plate 68. The second bracket 69 in turn is adjustably supported by bolts 73 which extend through vertical slots in a T-shaped vertical support column 72 for movement therealong. Column 72, in turn, projects upwardly from a horizontal base 72 which is operatively and adjustably connected with the strip-corrugating portion of the apparatus as will be described.

With the adjustable arrangement illustrated, the welding head, and the welding contacts which project therefrom, may be moved vertically and horizontally to any extent desired and into any position of adjustment required relative to the line along which the weld seam is to be formed for pipe of a given size.

In this regard, the weld seam S is formed along a continuous weld line L (FIG. 20) defined by the marginal edge portion 27 of the metal strip as the strip is coiled about the generally horizontal axis 10, which defines the axis of the completed pipe 12, to bring the other edge portion 26 into contact with the edge portion 27, all as seen in FIGS. 1 and 20.

The base 74 for the welding mechanism 56 and the pipe-forming mechanism 57 to be described is adjustably connected to the carriage 17 beneath the corrugating portion of the apparatus by means of a carriage-frame extension, generally designated 75 (FIG. 1), which projects from the carriage. Adjacent an end of the frame extension 75 is a pivot shaft 76 which is mounted on base 74, about the axis of which the carriage 17 is pivotal so that the axis 11 of the strip 1 may be altered relative to the axis 10 of the pipe to be formed. The vertical axis of shaft 76 lies in the plane of pipe axis 10. Thus, the helical pitch of the pipe being formed may be selectively varied upon movement of carriage 17 about the axis of shaft 76 to permit pipe of various diameters to be produced.

The welding head contacts, collectively designated 76' as seen in FIGS. 1 and 10, depend from the welding head 62 and are positioned to engage the two converging marginal edge portions 26 and 27 of the strip at a location slightly in advance of the actual point of contact of the two edge surfaces 41 with each other. The contacts may be positioned and oriented so that both engage the inner (upper) or outer (lower) surfaces of the strip as it is being coiled. Alternatively, such contacts may be oriented so that one engages an inner surface and the other engages an outer surface of the strip. In the first preferred embodiment shown in FIGS. 10 and 12 through 15, the contacts designated 77 and 78 are positioned so that both engage the inner (upper) surfaces of the strip (note FIGS. 7 and 15).

The relationship between the two edge surfaces 41 of the strip edge portions just prior to being welded together is seen in FIG. 7. The beveling and selective deformation of such edge portions permits orienting edge surfaces 41 in horizontally spaced, generally parallel relation at the location at which the strip is engaged by the contacts 77 and 78. The edge surfaces must be spaced from each other at such location so that, when the high frequency resistance welding technique is employed, the current will flow along such edge surfaces to the point of engagement or closing therebetween (at FIG. 8) rather than shorting across adjacent the contacts. The current path along strip edge surfaces 41 (between the sites of FIGS. 7 and 8) must be of sufficient length to heat the surfaces to a welding temperature, and depends upon such factors as type and thickness of strip material, strip speed, power supplied, etc.

It will be noted that trailing edge portion 26 is also slightly vertically displaced from leading edge portion 27 at the points of engagement of contacts 77, 78 (FIG. 7) because portion 26 is being curled downwardly toward the original plane of the strip 1. Edge surfaces 41 remain in horizontally spaced, generally parallel relation as edge portion 26 is brought into the plane of edge portion 27 and thereafter said surfaces are horizontally displaced into welding engagement (FIG. 8). The deformation of the edge portions out of the original plane of the corrugated sheet (FIG. 7) also results in sufficient strip material being available to insure a continuous welded seam which forms part of, and a generally smooth continuation of, the regular corrugated configuration of the completed pipe.

Lateral or horizontal pressure is applied to the heat-softened edges of the strip in the area of the welded seam S by deforming the same upwardly to again bring the corrugation of which seam S forms a part back into continuity with the other corrugations of the pipe (FIG. 8). Thus, the uniform corrugated contour of the completed pipe is maintained. Without the strip-edge-conditioning operations previously described, an irregular contour in the areas defined by the weld seam might otherwise result in the completed pipe.

Although the steps of conditioning and deforming the strip prior to welding have been described with respect to the edge portions of a corrugated strip, it is understood that similar steps may be employed at other locations on a corrugated strip or on a flat strip in the formation of smooth wall pipe. For example, deforming any portion (central or edge) of a strip out of its normal condition results in at least one edge being displaced laterally inwardly so that the strip is slightly narrower than its original width. With the pipe-forming mechanism adjusted so as to bring the opposite edges of an undeformed strip into abutting engagement upon curling the same through a helical convolution, the edges of the deformed strip will be spaced apart, thus creating the gap therebetween at the welding contacts which is necessary in high frequency resistance welding. After the strip edges have passed the welding contacts, the strip is reformed, or the displaced edge is replaced, to its original condition and width which causes the edges to come into abutting engagement under lateral pressure at the weld point. Preferably, the strip edges are so positioned that they come together with sufficient lateral pressure to slightly deform the same (FIG. 8) in order to form a high quality forge weld.

An alternative method of narrowing the strip to create horizontal or lateral spacing between the edges just prior to welding contemplates upsetting or displacing at least one of the edges inwardly of the strip, applying current through contacts to the spaced edges, and then replacing or extruding the edges into abutting relation at the weld point. Such extruding step may, itself, provide sufficient welding pressure, or, as a further alternative, the upset portions of the edges may provide shoulders for the application of lateral pressure to such edges by means of opposing side rollers or the like.

The first preferred embodiment of the welding head contacts, and the structure by which they are supported in depending relationship from the welding head 62, are seen in FIGS. 10 and 12 through 15. A bus bar 79 projects laterally from frame member 81 (FIG. 10) extending from the bottom of the welding head. The respective welding head contacts 77 and 78 are selectively positionable on bus bar 79.

A mounting bracket, defined by separable upper and lower sections 82 and 83, is positioned around the bus bar and is secured thereto at a predetermined location. The upper section 82 of the bracket is provided with spaced apertures 84 therethrough which are alignable with threaded bores (not shown) in the lower section 83 of the bracket. Suitable threaded fasteners (not shown) extend through the apertures 84 into the threaded bores so that the bracket may be clamped securely to the bus bar.

The lower section 83 of the bracket has an extension 86 (FIG. 13) formed as an integral portion thereof. It is beneath such extension 86 that the welding contacts 77 and 78 are securable. As seen in FIG. 13, each of the welding contacts is provided with a cutout portion which permits the contacts to underlie and closely engage the lower section of the bracket and its extension 86. Spaced apertures 87 extend through the bracket extension 86 and such apertures are alignable with threaded bores 88 provided in each of the welding contacts. When the welding contacts are engaged with the bracket, such bores 88 are aligned with the bracket apertures 87 so that fasteners (not shown) may be threaded into the bores to securely maintain the welding contacts 77 and 78 in engagement with the bracket as seen in FIG. 12.

As noted from FIGS. 12, 14 and 15, the respective welding contacts are contoured to interfit with each other in a compact assembly. In this regard, it will be noted that sheets 89 of suitable insulating material are interposed between all adjacent surfaces of the respective welding contacts to preclude the possibility of the contacts shorting out during use thereof.

Preferably, each of the welding contacts is provided with internal channels which extend therethrough through which cooling fluid may be circulated. To this end, as seen in FIG. 13, each contact has formed in a side surface thereof threaded bores 91 into which inlet and exhaust conduits 92 and 93 are received. Such conduits introduce and remove circulating cooling fluid from the contacts. Preferably, the internal channels in the welding contacts extend to the tips thereof for maximum cooling effect. The source of such cooling fluid has not been shown.

The welding contacts are elongated and specially contoured to permit the same to extend into a location adjacent the point of actual welding engagement of the metal strip as the same is coiled to bring its opposite marginal edge portions 26 and 27 into contact with each other as seen in FIGS. 14 and 15. In this regard, the welding contacts are provided with laterally extending flanges 94 and 96, respectively, from which the respective welding electrode tips 97 and 98 depend. Flange 94 of contact 77 underlies flange 96 of the contact 78 as seen in FIG. 15. The respective welding tips 97 and 98 lie closely adjacent each other but are slightly spaced to straddle the gap formed by the converging edge portions of the strip (FIG. 12).

Each of the welding tips 97 and 98 terminates at its lower end in a contact point, designated 99 and 101, respectively. The contact points are contoured in accordance with the configuration of that portion of the metal strip being engaged thereby during the welding operation. That is, as seen in FIG. 14, contact point 99 is generally flat (horizontal) because it engages the generally horizontally extending edge portion 27 of the strip which is fed past the welding station in generally planar condition. However, the contact point 101 is provided with a convex surface which conforms to the curvature of the strip edge portion 26 as the strip is being coiled into the configuration of a pipe.

Figure 22:
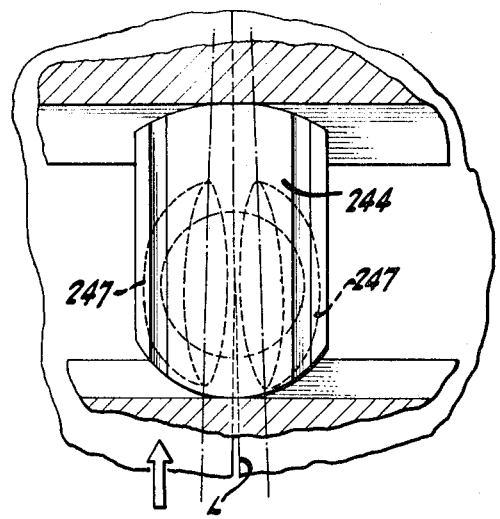
FIG. 22 is a horizontal sectional view taken in the plane of line 22—22 of FIG. 21 of such modified top pressure means.

It should be understood in this regard that the welding points of the respective welding contact tips desirably are maintained in sliding contact with the respective strip edge portions to insure effective transmission of electrical heating current to the edge portions. It should also be noted that the welding tips 99 and 101 are in contact with their respective edge portions at a location spaced slightly upstream from the area of actual engagement of the two edge portions with each other. Thus, when current is applied to the strip by welding contact 77, the current flows from such contact along marginal edge portion 27 of the strip towards the location at which the strip edge portions engage each other. Then the current generally reverses its path and flows along the other strip edge portion 26 back to welding contact 78 to complete the circuit. It is such current flow which produces sufficient heat to soften the strip to permit welding thereof in known high frequency technique fashion. The current thus flows in a generally V-shaped path from one welding contact to the other (FIGS. 12, 22).

The strip marginal edge portions are heated to an elevated temperature sufficient to soften the same and to produce therebetween a uniform forge-type welded structure when pressure is applied. The amount of heat necessary for that purpose will be determined from known information, depending upon the material being employed for the pipe being formed.

Preferably, a tube 106 is provided to introduce a fluid coolant to the weld zone, as seen in FIG. 10. Such tube discharges a suitable coolant onto the weld seam after the same has been completed. As also noted in FIG. 10 such coolant tends to pool in the bottom of the pipe being formed in the area of the weld seam to enhance the cooling effect.

Figure 25:
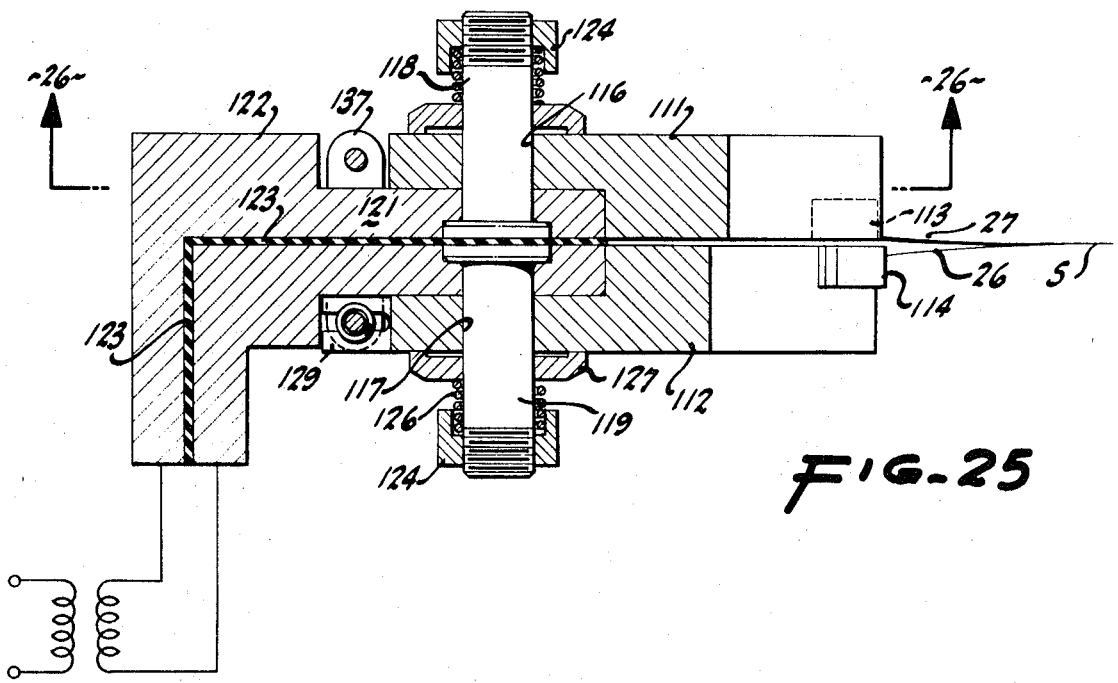
FIG. 25 is a horizontal sectional view through the modified welding head contacts taken in the plane of line 25—25 of FIG. 24, the pipe being formed having been omitted for purposes of clarity of illustration.
Figure 24:
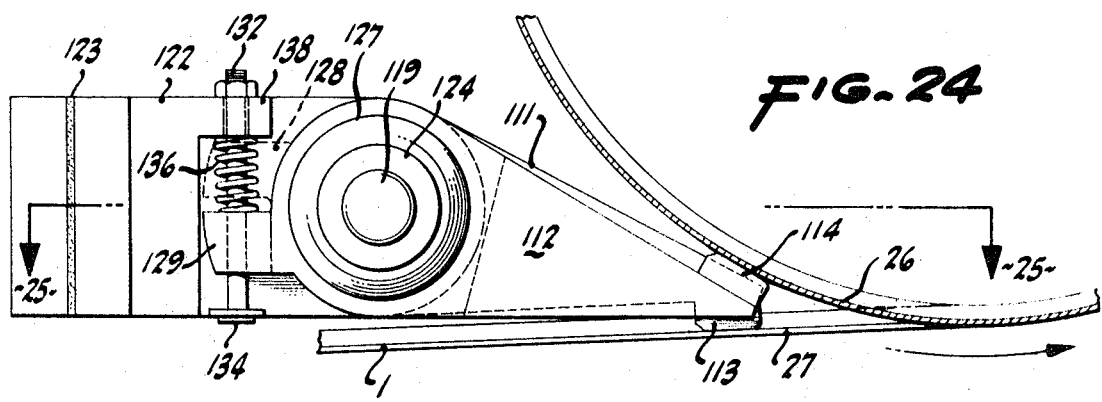
FIG. 24 is a side elevational view of a modified embodiment of the welding head contacts.
Figure 26:
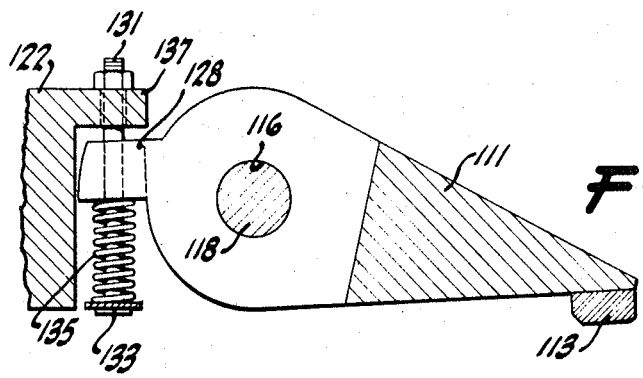
FIG. 26 is a vertical sectional view through the modified welding head contacts taken in the plane of line 26—26 of FIG. 25.

As previously noted, alternate arrangements for applying electrical heating current to the strip edges being welded together may be employed. A modified embodiment of the welding contacts is shown in FIGS. 24 through 26. The basic concepts and procedures employed in this modified arrangement are essentially the same as those just described with the embodiment of FIGS. 12 to 15. The principal difference between the two embodiments resides in the location of the sliding engagement of the welding contacts with the strip edge portions. That is, with this modified embodiment, one welding point is engaged with the inner (upper) surface of the strip while the other welding point is engaged with the outer (lower) surface of the strip.

It should also be understood, although inlet and outlet cooling fluid conduits have not been shown in conjunction with the modified embodiment, that an internal cooling arrangement similar to that described with the prior embodiment of the welding contacts may also be employed with the modified embodiment, if desired or found necessary.

The modified welding contacts, designated 111 and 112, respectively, include structure for spring-urging their respective welding points 113 and 114 in opposite pivotal directions so that such points may contact adjacent but opposite surfaces of the edge portions of the strip being welded. To this end, the welding contacts are provided with lateral bores 116 and 117 extending therethrough, as seen in FIG. 25. Each contact is mounted on a headed pin, 118 and 119 respectively, which extends through an associated bore just described. Each headed pin, in turn, is supported to project laterally from and through an extension 121 of a mounting bracket 122 by means of which the welding contacts are secured to a supporting bus bar in the manner described previously with respect to the embodiment shown in FIGS. 12 through 15.

It should be noted that bracket 122 is formed in two pieces which are separated from and insulated from each other by sheets of suitable insulating material 123. It should also be noted that the headed pins 118 and 119 on which the welding contacts are pivotally mounted are similarly insulated from each other by the sheets 123.

The respective contacts 111 and 112 are laterally urged toward each other on the pins 118 and 119 by spring mechanisms mounted on the outer threaded ends of each of the pins. In this regard, a retaining nut 124 is threaded on the end of each pin and a coil spring 126 is interposed between each such nut and a washer 127 engaged with the outer surface of the respective contacts. The respective springs urge the welding contacts laterally along the axis of the respective pins and maintain the contacts in operative position.

The welding contacts 111 and 112 are also spring-urged toward engagement with the respective marginal edge portions of the strip being welded. To this end, each of the contacts is provided with a projecting ear, 128 and 129, respectively. Such ears are bifurcated, as seen in FIG. 25, so that threaded pins 131 and 132, respectively, may be extended through such ears. Each such pin is provided with an enlarged head 133 and 134, respectively, and coil springs 135 and 136, respectively, are positioned around such pins. Each pin also projects through an associated ear 137 and 138 provided on the respective portions of the mounting bracket 122, which ears provide means for maintaining the respective pins in operative position on the bracket.

The coil spring 136 provided in conjunction with welding contact 112 (FIG. 24) is interposed between the associated ear 138 of the mounting bracket and the ear 129 of the welding contact. Thus, the urging effect of spring 136 forces ear 129 downwardly when viewed in FIG. 24 to thereby pivotally urge welding contact point 114 in a counterclockwise or upward direction as viewed in that figure.

As seen in FIG. 26, spring 135 provided in conjunction with welding contact 111 is interposed between the enlarged head 133 of the pin and ear 128 of the welding contact. Thus the urging effect of spring 135 forces ear 128 upwardly when viewed in FIG. 26 to thereby pivotally urge welding contact point 113 in a clockwise or downward direction as viewed in that figure.

The urging effect of the springs as described insures that the respective welding contacts may at all times be maintained in direct sliding contact with the respective marginal edge portions 26 and 27 of the strip being welded, as seen in FIG. 24. So long as proper contact is maintained between the welding contacts of either welding embodiment and the metal strip, sufficient heat will be generated to effect a secure butt-welded seam when lateral pressure is applied to the strip.

As will be described hereinafter, means are provided in conjunction with the mechanism which forms the pipe into a continuous series of helical convolutions for applying lateral pressure to the marginal edges of the metal strip which have been heated by the welding contacts just described. Such pressure means are positioned in conjunction with the pipe-forming mechanism for selective adjustment so that the pressure means may be precisely located to perform the intended function irrespective of the diameter size of the pipe being formed or the gauge of the metal strip being handled.

The pipe-forming mechanism 57 provided at station 9 (FIG. 1) is illustrated in detail in FIGS. 10 and 11 and comprises three elongated strip-supporting and pipe-forming roll assemblies, designated 146, 147 and 148. The orientation of such roll assemblies in the overall apparatus is seen in phantom lines in FIG. 1. It will be noted from FIG. 10 that roll assembly 147 is mounted generally centrally between roll assemblies 146 and 148, with the axis of the former extending generally parallel to but positioned above the axes of the latter.

As also seen from FIG. 10, the metal strip 1 being formed into a continuous length of pipe is fed between the three roll assemblies and is formed thereby into a series of continuous helical convolutions in the manner disclosed in detail in the aforementioned Davis patent. Roll assembly 148 is adjustably mounted, as will be described, to permit the same to be shifted laterally as viewed in FIGS. 10 and 11 toward or away from the axis of roll assembly 146. Such lateral shifting when selectively effected permits the convolutions of the pipe to be formed to be varied in diameter. As perhaps best seen in FIG. 11, each of the roll assemblies 146, 147 and 148 comprises a series of side-by-side adjustable wheels designated 151, 152 and 153, respectively.

The lower roll assemblies 146 and 148 are supported on an extension 156 (FIG. 1) of the base 74 mentioned previously. The upper roll assembly 147 projects in cantilever fashion outwardly from the vertical support column 72 mentioned previously. In this regard, roll assembly 147 is supported in a horizontally extending guide way 155 which is secured to the support column 72 by means of a plate 157 bolted or welded thereto as seen in FIGS. 1 and 10.

Similar guideways, designated 158 and 159, respectively, form part of the lower roll assemblies 146 and 148. It is in such guideways that the wheels 151, 152 and 153 of the respective rolls are selectively and adjustably mounted for pivoting about vertical axes and longitudinal sliding movement in accordance with the nature of the corrugated strip being formed into pipe. As should be apparent from FIG. 11, the wheels of the respective roll assemblies are horizontally spaced form each other in accordance with the dimensions and spacing of the corrugations of the metal strip. While in the embodiment illustrated such wheels are contoured and positioned to ride in the valleys of the metal strip, it should be understood that the orientation and contour of such wheels may be varied to adapt the same to ride on the crests of such corrugations if preferred.

REference is now directed to FIGS. 10, 16 and 19 for details of the mounting arrangement by which the respective wheels of the respective roll assemblies are operatively maintained in their associated guideways. In this regard, while a description of the upper or mandrel roll assembly 147 will now be described, it should be understood that the mounting arrangement for the wheels in the lower or lead and buttress roll assemblies 146 and 148 is substantially the same except for a reversal in the direction in which the wheels project from their associated guideways.

Way 155 is provided with a pair of opposed inwardly extending lips 159 which cooperate to define a longitudinally extending restricted channel 160 therebetween. Each wheel 152 is individually mounted in a yoke 161 which projects from a cooperable mounting plate 162 received in channel 161 beneath lips 159. As seen in FIG. 16, the lateral margins of plates 162 are rounded so that relative rotation of the plates generally about the axis of yokes 161 is permitted to a predetermined limited extent.

Each of the mounting plates is formed with a pair of spaced parallel grooves 162 in its upper surface. Connectors 164 are interposed between the mounting plates 162 and the base of the channel 161 and operatively interconnect adjacent mounting plates and the wheels carried thereby. In this regard, each connector 164 is generally U-shaped having spaced legs which are slidably received in the grooves 163 of the pair of adjacent mounting plates engaged thereby. The interconnection of the mounting plates by the connectors permits uniform and simultaneous reorientation of all the wheels in unison upon reorientation of one mounting plate. Each wheel 152 is rotatably supported on a pivot pin 166 which extends through the legs of an associated yoke 161.

As noted from FIGS. 10 and 11, the lower roll assemblies 146 and 148 have their respective wheels 151 and 153 similarly mounted in guideways 158 and 159 provided therefor. In this latter regard, guideway 158 is fixedly secured to the base extension 156 while guideway 159 is slidably movable thereover to permit lateral adjustment of assembly 148 relative to assemblies 146 and 147.

In this latter regard, L-shaped angle brackets 167 are secured in parallel relationship to base extension 156 at opposite sides thereof and guideway 159 has a portion thereof received beneath the overhanging portion of each such L-shaped bracket. Sliding movement of the guideway over the base extension 156 therefor may be effected.

Means for laterally adjusting the position of guideway 159, and the wheels 153 carried thereby, comprises in the embodiment shown manually operable mechanism which includes a handcrank 170 (FIG. 11) mounted on a boss portion 171 of a sprocket wheel 172. The sprocket wheel has a threaded bore 173 therethrough which is movable along the length of a threaded adjusting screw 174 which is secured by a mounting bracket to the side of the guideway 159. Interposed between bracket 176 and crank 170 is a mounting plate 177 through which the screw 174 slidably extends. Plate 177 is secured to the edge of base extension 156. Upon rotation of crank 170, the guideway may be drawn toward or moved away from the plate 177 to thereby alter the location of the guideway 159 and the wheels 153 carried thereby as desired or required.

To permit uniform adjustable positioning without canting of the guideway 159, it has been found preferable to employ a second duplicate adjusting screw assembly as seen in FIG. 11. The wheels 172 of the screw assemblies are operatively interconnected by a chain 178 so that upon rotation of crank 170 the chain will effect uniform rotation of both sprocket wheels and uniform movement of the guideway 159 along its full length.

From the foregoing, it should be understood that upon actuation of crank 170, the position of roll assembly 148 may be selectively modified so that the diameter of the pipe to be formed may be selectively varied to meet requirements.

To permit the pipe-forming mechanism to alter the pitch of the helical convolutions to be formed in conjunction with change of diameter, (so that the same width metal strip may be used to form pipe of various diameters) the carriage 17 which underlies the corrugating portion of the apparatus is pivoted about the vertical axis of pivot shaft 76 relative to the pipe-forming mechanism 57. Although the axis of pivot shaft 76 is shown in FIG. 1 intersecting the trailing edge 26 of strip 1, it should be understood that such axis may intersect pipe axis 10 at other locations therealong, including at trailing edge 27. One advantage of the latter is that the closing or welding point of strip edges 26, 27 and, therefore, the location of the welding contacts and pressure means, remains relatively stationary when carriage 17 is pivoted with respect to forming mechanism 57.

Upon such movement, and the attendant pitch change imparted to the strip thereby, it is necessary to alter the angular orientation of the respective wheels of the roll assemblies 146, 147 and 148. Preferably such angular reorientation of the wheels is effected automatically in conjunction with the movement of the carriage relative to the pipe-forming mechanism which changes the infeed angle of the strip axis 11 relative to the outfeed angle of the pipe axis 10.

To this end, as seen in FIG. 11, a connecting rod 181 is rigidly secured in any suitable fashion to the aforementioned frame extension 75 which projects from the carriage 17. Rod 181 slidably extends through bores provided in bearing members 182 and 183, respectively, which are bolted to the end wheels 151' and 153' of roll assemblies 146 and 148. Upon alteration of the angular relationship between carriage 17 and the pipe-forming mechanism, rod 181 will be correspondingly altered in position and will effect automatic angular reorientation of the end wheels 151' and 153'. Because of the interconnection of such end wheels, via connectors 164 mentioned previously, with the other wheels in each roll assembly, each wheel in the respective roll assemblies 146 and 148 will be similarly and uniformly angularly reoriented.

If desired, wheels 152 of the upper roll assembly 147 may be similarly interconnected with carriage 17 by a rod similar to rod 181 or, alternatively, an extension of such rod 181 may be engaged with the end wheel of such upper assembly so that selective reorientation of the wheels 152 thereof may be effected automatically also.

It will also be noted from FIG. 11 that upper roll assembly 147 is provided with more guide wheels 152 than are lower roll assemblies 146 and 148. Upper roll assembly 147 is longer and is located to extend into the pipe as it is being formed so that at least one of its wheels 152 may ride within the corrugations of the completed pipe. (See FIG. 20.)

Upper roll assembly 147 also provides a base for mounting the upper pressure means which reforms and thereby applies lateral pressure to the contacting marginal edge portions of the metal strip as it is being formed into pipe convolutions. In this connection, reference is now directed to FIGS. 8, 10, 11 and 17 through 19 which illustrate one preferred embodiment of the opposed upper and lower pressure means employed in the subject apparatus to insure formation of a uniform forge-type butt-welded seam in the completed pipe. As noted previously, the application of uniform lateral pressure to the heated abutting edge portions of the strip being welded is important to insure a proper weld seam. The subject pressure means produces such results.

Referring first to FIG. 8, the upper pressure means comprises a pressure roll structure designated 186, while the lower pressure means comprises a pressure roll structure designated 187. In the embodiment illustrated, the upper roll structure is defined by a pair of laterally spaced pressure rolls 188 which are formed with concave peripheries which adapt the same to ride upon the crests of the corrugations located on opposite sides of the weld line defined by seam S. Pressure rolls 188 exert downward pressure on the strip and thereby urge the marginal edge portions 26 and 27 of the strip laterally into abutting relationship with each other so that such edge portions become securely bonded together in the presence of the heat applied thereto by the welding contacts described previously.

The lower pressure means in the embodiment illustrated comprises a rotatable pressure roll 191 which underlies the weld line defined by the welded seam S. The lower roll backs up the weld seam and is provided with a concave periphery which permits the same to conform closely to the contour of the corrugation which is formed when the marginal edge portions 26 and 27 of the sheet are joined together. Preferably lower backup roll 191 is provided with a peripheral groove therein, designated 192, which permits any weld flash, of which there is a minimum formed with this procedure, to pass into such groove.

With the pressure roll system described, comparing FIG. 7 with FIG. 8, it will be noted that the lateral pressure exerted by upper rolls 188 in conjunction with the backup pressure exerted by lower roll 191 results in the previously deformed marginal edge portions 26 and 27 of the strip being reformed, that is, urged upwardly back into their original condition in conformity with the other corrugations of the strip. Thus, the resulting corrugation formed by joining together such strip edge portions becomes a regular and uniform continuation of the other corrugations of the pipe being formed.

It has been found that the weld seam formed by this procedure blends in with the appearance of the completed pipe and is noticeable only upon close inspection. Most of the weld seam, as noted from FIG. 8, lies on the interior of the pipe so that it is not readily visible from the exterior of the pipe.

Preferably, as seen from FIG. 8, lower backup roll 191 is formed with insulating characteristics to preclude electrical shorting or the flow of current through the roll during a welding operation. By providing an insulating roll as shown, the current flowing between the welding contacts 77 and 78 must take the generally V-shaped path described previously. Thus, effective heating and secure welding are insured.

To this end, backup roll 191 preferably comprises a split roll construction defined by two adjacent roll portions 193 and 194 which are separated by a layer of suitable insulating material 196. The roll portions are mounted by suitable bearings on a dielectric pivot pin 197 to insure the insulating characteristics sought. Alternatively, roll 191 may be formed of ceramic or other dielectric material.

Referring now to FIGS. 10 and 11, it will be noted that the lower backup roll 191 is positioned directly in alignment with the weld line L. The roll is rotatably mounted in such position by a pivotal arm 201 adjustably secured by a mounting bracket 202 which, in turn, is supported by a brace 203 secured to the side of the aforementioned immovable guideway 158. Brace 203 has an elongated slot 204 formed therein and a nut and bolt fastener 205 extends through such slot to permit selective adjustment of arm 201, and backup roll 191 therewith. As seen in FIG. 19, pivot pin 197 for roll 191 is supported in spaced bearing arms 206 mounted on arm 201.

It has been found desirable to be able to adjust the back pressure exerted by roll 191 on the marginal edge portions of the metal strip as the same are being welded together. As seen in FIGS. 10 and 19, hydraulic means has been found effective for such purposes. In the embodiment illustrated, such hydraulic means comprises a downwardly extending cylinder 211 which depends from and is secured to the mounting arm 201 on which roll 191 is rotatable. Cylinder 211 has slidably received therein a piston 212, the lower curved surface of which is engaged with and seated upon a plate 213 secured to the aforementioned base extension 156.

As hydraulic fluid channel 214 communicates with the interior 215 of the cylinder 211 above piston 212 so that fluid introduced into such channel through a threaded inlet 216 connected with a conduit (not shown) may urge the cylinder downwardly which, in turn, urges pressure roll 191 upwardly into more secure rolling engagement with the undersurface of the marginal edge portions of the strip being welded. By altering the fluid pressure introduced into cylinder 211, the pressure exerted by the backup roll 191 may be altered selectively within wide limits.

FIGS. 16 through 19 show details of a preferred embodiment for mounting the top pressure rolls 188. Such mounting means comprises a yoke body 221, the upper portion 222 of which is received in the aforementioned channel 150 defined by the guideway 155 of the upper roll assembly 147. The yoke upper portion 222 is grooved at 223 to receive therein connectors 164 of the type described previously. Thus the yoke body may be positioned in the upper guideway 155 for adjustment therein in conformity with adjustment of the wheels 152 of the upper roll assembly 147. At its lower end, yoke body 221 is provided with two opposed T-shaped slots 224 (FIG. 18) each of which slidably receives therein a generally T-shaped slide member 226 from the outer surface of which projects a mounting pin 227 on which a pressure roll 188 is rotatably secured.

The yoke body has extending upwardly thereinto generally centrally thereof an unthreaded bore 231 in which is slidably and rotatably received a pinion member 232. Pinion member 232 is held in place in bore 231 by a lock screw 233 which extends transversely through a threaded bore 234 in the yoke body into engagement with a groove 236 provided adjacent the lower end of the pinion. The pinion is provided with a polygonal head 237 at its lower end which is accessible beneath the yoke body when the body is operatively positioned.

The upper end of the pinion is longitudinally fluted at 238, thereby adapting the pinion for engagement with rack teeth 241 provided on the slide members 226. The pinion flutes 238 are engaged with the respective rack teeth 241 as best seen in FIGS. 16 and 17 so that, upon rotation of the pinion, the slide members 226 and the pressure rolls 118 carried thereby may be moved in opposite directions relative to the axis of the guideway 155 in which the yoke body is positioned.

This rack-and-pinion adjustable mounting of the upper pressure rolls 188 permits such rolls to be selectively located to ride securely on the crests of the corrugations engaged thereby irrespective of the pitch or diameter size of the helical convolutions of the pipe being formed. Thus, effective and close pressure control on the marginal edge portions 26 and 27 of the metal strip may be insured under all operating conditions.

As seen from FIG. 20, the guide wheels 152 of the upper roll assembly, the upper pressure rolls 188, and the lower pressure roll 191, all have their planes of rotation lying parallel to the plane of weld line L along which seam S in formed. Also, each such wheel and roll lies across and its plane of rotation is bisected by the plane in which pipe axis 10 lies. The adjustable mounting mechanisms for such wheels and rolls as described previously permits that relationship to be maintained irrespective of the pitch of the convolutions of the pipe being formed.

FIGS. 21 and 22 show an alternative embodiment of the upper pressure means. In this arrangement, yoke body 243 is provided which has a slotted upper portion 244 conforming to that described previously with respect to yoke body 221 so that the same may be positioned in guideway 156 and retained therein by connectors 164 so as to be operatively interconnected for automatic reorientation with the wheels 152 of the upper guide roll assembly 147.

The lower portion 245 of the yoke body is generally triangular in configuration with the side surfaces thereof converging downwardly. Projecting from each of the converging side surfaces is a pivot pin 246 on each of which a split pressure roll 247 is rotatably mounted. Each pressure roll 247 has its periphery contoured to conform generally to the configuration of the valley of the corrugation formed when the edge portions 26 and 27 of the strip are welded together. The pressure rolls 247 are spaced from each other by the yoke body so that they lie on opposite sides of the weld line L.

The pressure rolls are mounted to rotate in converging planes each of which extends at a predetermined angle relative to the plane of the corrugated sheet, as seen in FIG. 21. Due to such inclination such pressure rolls apply lateral pressure to the marginal edge portions 26 and 27 of the strip being welded together to produce the controlled pressure required for the forge-type weld desired. The angle of inclination of the pressure rolls relative to the plane of the strip may vary but an inclination of approximately 10° has been found acceptable.

It should be noted from FIG. 22 that the pressure rolls 247 are also mounted to rotate in converging planes each of which extends at a predetermined angle relative to the plane of the weld line L. Such convergence further enhances the lateral pressure applied to the marginal edge portions of the strip to urge such edge portions into secure abutting relationship while heated. The degree of such convergence of the pressure rolls may also vary but, as seen in FIG. 22, an angular inclination of approximately 5° has been found acceptable without producing an undue amount of drag.

It should be understood that either of the upper pressure roll structures described above may be imparted with insulating characteristics in the manner described previously with respect to the structure of the lower pressure roll 191 if found necessary or desirable.

Figure 23:
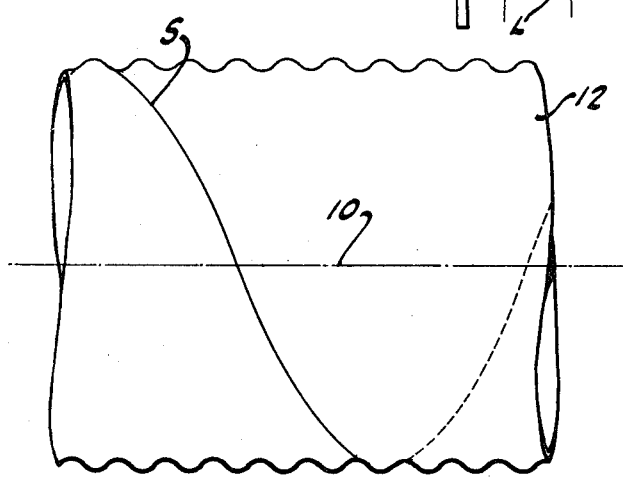
FIG. 23 is a plan view of a segment of helically corrugated butt-welded pipe produced by the subject apparatus and method.

A completed length of pipe showing the weld seam S extending helically therearound along the crest of one of its helical corrugations is shown in FIG. 23. Such length of pipe is discharged from the welding and forming station 9 to the runout station 13 at which is located means for supporting the pipe prior to its being severed into discrete sections by cutoff means (not shown) normally provided in conjunction with the apparatus disclosed herein.

The relation between edge portions 26, 27 of the strip must be carefully maintained in order to assure welding a seam, S, of high quality. Both the spacing of the strip edges at the points of engagement of the welding contacts in a high frequency resistance system and the relative location of the welding point of engagement of the edges are properly maintained by supporting the finished pipe at station 13 so that it will not be laterally or vertically disturbed.

The pipe-supporting mechanism 58 provided at station 13 is shown in FIG. 9 and comprises a frame 251 defined by spaced interconnected frame members 252 through which the pipe 12 passes from the welding station. The frame members 252 are each connected with an elongated base support 253 on which is mounted a pair of smooth cylindrical pipe-supporting rollers 254 over which the completed pipe moves past the runout station. Turnbuckle assemblies generally designated 256 are interposed between the base support and the rollers 254 and support such rollers in adjustable fashion so that they may be moved laterally toward or away from each other in accordance with the diameter of the pipe being formed. It should be understood that the rollers 254 are elongated and rotatably mounted and extend substantially the full distance between the two frame members 252.

Spacedly located around the periphery of frame members are two series of guide roller assemblies. The roller assemblies of the respective series are designated 257 and 258, respectively. Each of the roller assemblies 258 comprises a rotatable, elongated smooth cylindrical roller 259. However, each of the roller assemblies 257 comprises a roller 260 which, as seen in FIG. 9A, is defined by a series of laterally spaced wheels 261 maintained by setscrews 262 on a cylindrical shaft 263. The wheels 261 are positioned to ride in the corrugations of the completed pipe to assist in runout thereof past station 13.

Irrespective of the nature of the rollers employed with the respective series, such rollers are supported for in-and-out movement relative to the axis of the pipe. To this end, each roller assembly of both series includes a pair of slidable arms 266 mounted on the spaced frame members 252 with a roller extending therebetween. Each arm has an elongated slot 27 extending substantially the full length thereof. As seen at the top of FIG. 9, such slot 267 receives therein a guide member 269 secured to an associated frame member. Each guide member may be held securely in place on its frame member by threaded fasteners 270 extending therethrough and engaged with the frame member. When such fasteners are tightened, the guide member is held tightly against the frame member thereby clamping its associated slotted arm 266 against such frame member.

By loosening the fasteners 270 of each roller assembly, each such assembly may be properly oriented to engage the periphery of the pipe being formed, irrespective of its diameter. The phantom showing of FIG. 9 illustrates the wide range of adjustment of the roller assemblies 257 and 258.

The spacing between the frame members 252 is maintained by peripherally located spacing bars or rods, designated 265, secured to the frame members in any suitable fashion to impart rigidly thereto.

Reference is now directed to FIGS. 27 through 31 which illustrate an alternative arrangement for mounting the forming roll assemblies which engage and deform the metal strip 1 and bend the same into helical convolutions. The welding head contacts have not been illustrated but it should be understood that such contacts are to be positioned as described previously. In such figures, the lower lead and buttress roll assemblies are designated 271 and 272, respectively, while the upper, mandrel roll assembly is designated 273. The rotatable wheels of lower assembly 271 are designated 274 while the wheels of the other lower assembly 272 are designated 276. The wheels of the upper assembly 273 are designated 277. As noted in FIG. 27, such wheels of the respective assemblies ride in the valleys of the strip corrugations in the manner described previously and for the same purpose.

The arrangement described hereinafter permits and effects angular reorientation of the respective wheels of the respective forming roll assemblies in response to pitch change prompted by change in diameter of the pipe to be formed by the apparatus. While not shown in conjunction with this embodiment, it should be understood that the buttress roll assembly 272 normally includes adjusting mechanism in conjunction therewith for shifting the same laterally toward or away from the lead roll assembly 271. Such adjusting mechanism may take the form described previously with respect to the forming roll assembly 148 as shown in FIGS. 10 and 11.

Figure 27:
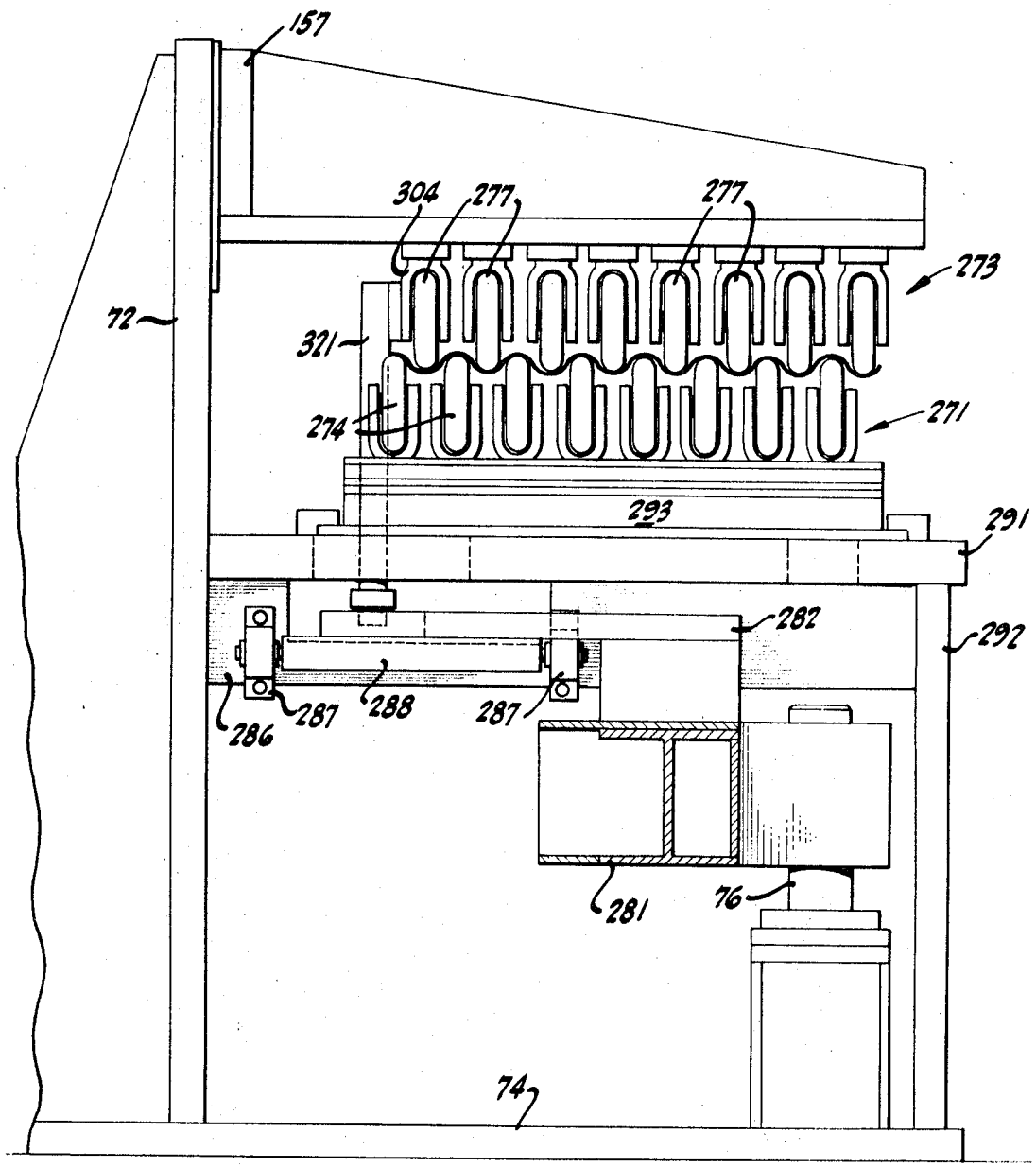
FIG. 27 is an end elevational view of a modified embodiment of the pipe-forming mechanism provided at the forming and welding station.

As seen in FIGS. 27 and 28, the pivot shaft 76 which interconnects the pipe-forming mechanism with the carriage 17 of the corrugating portion of the apparatus projects upwardly from the base 74 of the pipe-forming mechanism. One end of a hollow box beam member 281 surrounds the pivot shaft 76 and is rotatable in suitable bearing means (not shown) about the axis thereof. Beam 281, it should be understood, is connected in any suitable fashion with the frame extension 75 which projects from carriage 17, as seen in FIG. 1. Thus, upon movement of the carriage relative to the pipe-forming mechanism, beam 281 will pivot about the axis of shaft 76 to effect a change in the pitch of the metal strip fed to the pipe-forming mechanism. Simultaneously with movement of the beam 281, the mechanism connected therewith, as will be described, similarly is reoriented.

In this regard, as seen in FIGS. 28 and 31, an L-shaped angle-supporting arm 282 is secured by an extension of beam 281 directly to such beam for pivotal movement therewith. Arm 282 is of laminated structure and includes an elongated slot 283 which extends substantially the full length of one leg of the arm to receive cam followers as will be described. Slot 283 is defined by a slotted plate secured to the top of such arm by suitable fasteners.

A brace 286 extends outwardly from the vertical support column 72 from which the upper roll assembly 273 projects in cantilever fashion (FIGS. 27 and 28). Mounted in spaced bearings 287 secured to brace 286 is a roller 288 which underlies and supports the L-shaped angle arm 282 during pivotal movement thereof with the beam 281.

A baseplate 291 of generally rectangular configuration extends in a generally horizontal plane from the vertical support column 72 and is welded or otherwise suitably secured thereto. At its outer end baseplate 291 is supported by a vertical frame member 292 interposed between the plate and base 74 as perhaps best seen in FIG. 27. Baseplate 291 overlies the L-shaped angle arm 282 and it is on such baseplate that guideways designated 293 and 294 of the respective lower roll assemblies 271 and 272 are mounted. Such guideways are formed from a plurality of slotted laminated elongated pieces to facilitate manufacture and assembly therein of the components to be described.

It will be noted from FIG. 31 that baseplate 291 has provided therethrough a series of side-by-side openings 301, 302 and 303. Openings 301 and 302 are elongated slots of unequal length while opening 303 is trapezoidal in contour.

As with the forming roll assembly embodiment described previously, the wheels 274 and 276 of the lower roll assemblies and 277 of the upper roll assembly are rotatably supported in yokes 304 which, in turn, are secured to mounting plates 305 maintained in the guideways of the respective roll assemblies against removal but in such a fashion that limited rotation of such plates is possible (FIG. 29). Also, as with the roll assembly embodiment described previously, adjacent mounting plates 305 are interconnected with each other by U-shaped connectors 306 which are received in grooves 307 formed in the surfaces of such plates. Thus, upon pivotal movement of one mounting plate 305, all plates in a given roll assembly are simultaneously rotated an equal amount.

In this modification, means for effecting pivotal movement of one mounting plate in each of the lower roll assemblies 271 and 272 is illustrated by reference to FIG. 29 in which one such plate, designated 305', is provided with a slot 308 extending inwardly from an edge thereof. In such slot, a rectangular upper extension 309 of yoke-adjusting pin 311 is received. Upon rotation of pin 311 about its axis, its extension 309 received in slot 308 will cause rotation of plate 305' and with it the other plates 305 of the particular roll assembly.

It will be noted from FIG. 28 that each yoke-adjusting pin 311 has an enlarged collar 312 centrally thereof which is received in a slotted portion of an intermediate plate 313 which forms part of the laminated guideway 293. Such collar maintains the pin 311 in proper operative position in the guideway in that the laminated plate portions of the guideway above and below such collar, while also slotted to permit lateral movement as will be described, are of less diameter to preclude vertical movement of the pin out of the guideway.

It should be understood in this regard that the slots provided in the respective plates which make up the laminated guideway 293 extend in a direction which corresponds to the slot 301 formed in the baseplate 291. Because the other lower roll assembly 272 is laterally adjustable, the enlarged trapezoidal opening 303 is required to permit the wide range of movement of its adjusting pin 311 in all positions of such lateral adjustment.

Selective rotation of each of pins 311 in conjunction with pivotal movement of the beam 281 is effected by means of a cam follower 316 mounted on the lower end of such pin. Keyed to pin 311 above the cam follower is a cam arm 317 which has connected thereto and depending therefrom another cam follower 318. Both cam followers 316 and 318 are received in the slot 283 formed in the L-shaped angle arm 282 mentioned previously. The arrangement of the cam followers and the interconnecting follower arm are best seen in FIGS. 28 and 30.

Referring to FIG. 31 it will readily be seen that movement of beam 281 about the axis of pivot shaft 76 will produce attendant movement of the L-shaped angle arm 282, which movement will, in turn, cause the cam followers 316 and 318 to move longitudinally in the slot 283. Such movement will produce simultaneous rotation of the respective yoke-adjusting pins 311 about their axes. Such pin rotation, as noted previously, will effect corresponding reorientation of the wheels 274 and 276 of the respective roll assemblies 271 and 272.

Thus, when pitch change of the metal strip being welded is desired to effect change in the diameter of the pipe being formed, automatic reorientation of the forming roll wheels may similarly be effected automatically by the mechanism described.

A similar arrangement is provided to automatically reorient the wheels 277 of the upper roll assembly 273 in accordance with movement of the beam 281. In this regard, a yoke-adjusting pin 321 projects upwardly through slot 302 in the baseplate 291. Such pin at its lower end is provided with cam follower structure of the type described previously. At its upper end pin 321 is secured directly to the end yoke 304 of the upper roll assembly, as best seen in FIG. 27.

With the modified arrangement just described, all wheels of the respective roll assemblies 271, 272 and 273 may be reoriented uniformly and in unison automatically in response to reorientation of the corrugating portion of the apparatus relative to the pipe-forming mechanism thereof.

From the foregoing, it will be seen that this invention embodies an apparatus and method for welding together opposite edge portions of a metal strip, particularly corrugated metal strip, to produce a novel product in a continuous forming operation. While detailed descriptions and illustrations of preferred embodiments of the various mechanisms which comprise the subject invention have been made, such descriptions and illustrations should be considered illustrative, rather than restrictive, in that modifications thereto which may occur to one skilled in the art after reviewing the same are contemplated within the spirit and scope of the invention as set out in the appended claims.

I claim:

1. A method of forming helical pipe from an elongated metal strip, comprising:
    A. moving said strip longitudinally past a pipe-forming station,
    B. at said station coiling said strip into a continuous succession of helical convolutions of predetermined diameter,
    C. deforming at least one marginal edge portion of said strip in the direction laterally inwardly of said strip,
    D. reforming said one edge portion in the direction laterally outwardly of said strip the distance of said deforming, into abutting engagement under lateral pressure with the other marginal edge portion,
    E. With said marginal edge portions so positioned, and under such lateral pressure, heating said edge portions to a temperature sufficient to weld the same together when pressure is applied thereto, and thereby joining the same together in nonoverlapped abutting engagement to provide therebetween a continuous butt-welded seam.

2. A method of forming helical pipe form an elongated metal strip, comprising:
    A. moving said strip longitudinally past a pipe-forming station,
    B. at said station coiling said strip into a continuous succession of helical convolutions of predetermined diameter,
    C. bringing one marginal edge portion of said strip as the same is formed into said convolutions into abutting nonoverlapping engagement with the other marginal edge portion of said strip, D. heating said edge portions to a temperature sufficient to weld the same together when pressure is applied thereto, E. applying lateral pressure to said heated edge portions to join the same together in nonoverlapped abutting engagement to provide therebetween a continuous butt-welded seam, F. conditioning the edges of said marginal edge portions of said strip before moving the same to said station, including,
1. forming inwardly beveled edge surfaces on each of said strip marginal edge portions, and
2. deforming each of said edge portions slightly out of the regular contour of said strip whereby said edge surfaces are generally parallel as said edge portions are brought into said abutting engagement, and G. reforming said edge portions back into conformity with the regular contour of said strip when said lateral pressure is applied thereto during welding.

3. A method of forming helically corrugated pipe from an elongated metal strip having longitudinal corrugations extending therealong, comprising:
A. uninterruptedly moving said corrugated strip past a pipe-forming station along a line defined by the longitudinal axis of said strip,
B. at said station coiling said strip into a continuous succession of helical convolutions of predetermined diameter about a pipe axis which extends at an oblique angle relative to said strip axis,
C. bringing the surface of one edge of said corrugated strip as the same is formed into said convolutions into abutting contact with the surface of the other edge of said strip,
D. heating the marginal edge portions of said strip to an elevated temperature sufficient to weld the same together when pressure is applied thereto, and
E. applying lateral pressure to said heated edge portions to join said surfaces together therebetween a continuous butt-welded seam without interrupting movement of said strip past said station.

4. The method of claim 3, wherein
A. said lateral pressure is effected by applying pressure to one side of the corrugations located on opposite sides of said one corrugation and to the opposite side of said edge portions, and,
B. at said station said strip edge portions are joined so that together they define one helical corrugation of the completed pipe.

5. A method of forming helically corrugated pipe from an elongated metal strip having longitudinal corrugations extending therealong, comprising:
A. uninterruptedly moving said corrugated strip past a pipe-forming station along a line defined by the longitudinal axis of said strip,
B. at said station coiling said strip into a continuous succession of helical convolutions of predetermined diameter about a pipe axis which extends at an oblique angle relative to said strip axis,
C. bringing the surface of one edge of said corrugated strip as the same is formed into said convolutions into abutting contact with the surface of the other edge of said strip,
D. heating the marginal edge portions of said strip to an elevated temperature sufficient to weld the same together when pressure is applied thereto,
E. applying lateral pressure to said heated edge portions to join said surfaces together in abutting engagement to provide therebetween a continuous butt-welded seam without interrupting movement of said strip past said station,
F. locating said butt-welded seam so that said strip edge portions together define one helical corrugation of the completed pipe, and
G. said lateral pressure being supplied to said edge portions in the valley of said one corrugation on opposite sides of the seam formed thereby.

6. The method of claim 3 in which:
said strip edge portions are heated by electrical current applied to said edge portions by welding contacts engaging said edge portions at said station slightly in advance of the point at which said edge portions come into engagement with each other.

7. Apparatus for forming helically corrugated welded pipe from an elongated longitudinally corrugated metal strip, comprising:
A. means for moving said strip past a station,
B. means at said station for coiling said strip into a continuous succession of helical convolutions by bringing opposite marginal edge portions of said strip into abutting nonoverlapped engagement at a welding point,
C. means at said station for heating said strip marginal edge portions to an elevated temperature sufficient to weld the same together in the presence of pressure, and,
D. means for exerting lateral pressure to said heated edge portions to join the same together along the line of engagement therebetween to form a continuous nonoverlapped butt-welded seam extending helically around and along the pipe thus formed, said last named means including,
1. opposed pressure-applying structures positioned to engage opposite surfaces of said strip edge portions,
2. each of said structures being operatively engaged with said edge portions on opposite sides of said line of engagement therebetween,
3. at least one of said structures including devices positioned to contact and urge said edge portions inwardly toward each other comprising a pair of laterally spaced rolls engaged with and riding generally upon the crests or corrugations positioned on opposite sides of said line of engagement along which said strip marginal edge portions are welded together.

8. Apparatus for forming helically corrugated welded pipe from an elongated longitudinally corrugated metal strip, comprising:
A. means for moving said strip past a station,
B. means at said station for coiling said strip into a continuous succession of helical convolutions by bringing opposite marginal edge portions of said strip into abutting nonoverlapped engagement at a welding point,
C. means at said station for heating said strip marginal edge portions to an elevated temperature sufficient to weld the same together in the presence of pressure, and,
D. means for exerting lateral pressure to said heated edge portions to join the same together along the line of engagement therebetween to form a continuous nonoverlapped butt-welded seam extending helically around and along the pipe thus formed, said last-named means including,
1. opposed pressure-applying structures positioned to engage opposite surfaces of said strip edge portions.
2. each of said structures being operatively engaged with said edge portions on opposite sides of said line of engagement therebetween,
3. at least one of said structures comprising a pair of opposed cooperable roll portions engaged with and riding in the valley of the corrugation which is defined by the strip marginal edge portions being welded together,
4. said roll portions lying on opposite sides of said line of engagement along which said edge portions are welded together.

9. The apparatus of claim 8 in which:
said roll portions are mounted to rotate in planes which converge relative to each other so that lateral pressure is applied thereby to said edge portions.

10. Apparatus for forming pipe from an elongated metal strip comprising:
A. means for moving said strip past a station,
B. means at said station for coiling said strip into a continuous succession of helical convolutions by bringing opposite marginal edge portions of said strip into abutting nonoverlapped engagement at a welding point, C. means at said station for heating said strip marginal edge portions to an elevated temperature sufficient to weld the same together in the presence of pressure, D. means for exerting lateral pressure to said heated edge portions to join the same together along the line of engagement therebetween to form a continuous nonoverlapped butt-welded seam extending helically around and along the pipe thus formed, E. means at said station for deforming at least one of said marginal edge portions out of the normal contour of said strip prior to movement of said marginal edge portions to said welding point, and F. means at said welding point for reforming said one marginal edge portion back to the normal contour of said strip.

11. The apparatus of claim 10, including:
means for forming the edge surfaces of said marginal edge portions into generally parallel relation as they approach said weld point.

12. Apparatus for forming helically corrugated welded pipe from an elongated longitudinally corrugated metal strip, comprising:
A. means for uninterruptedly moving said strip to and past a forming station,
B. means at said station for coiling said strip into a continuous succession of helical convolutions by bringing opposite marginal edge portions of said strip into abutting nonoverlapped engagement,
 1. said strip edge portions together defining a helical corrugation in the completed pipe which corresponds in contour to the other helical corrugations thereof,
C. means at said station for heating said marginal edge portions of said strip to an elevated temperature sufficient to weld the same together when engaged in the presence of pressure,
D. means for exerting lateral pressure to said heated edge portions to join the same together along the line of engagement therebetween to form a continuous butt-welded seam which extends helically around and along the pipe thus formed for its full length,
E. means for changing the angle at which said strip is fed to said forming station when it is desired to change the diameter of the pipe being formed, and in which said means for coiling said strip comprises:
 1. a plurality of guide roll assemblies between which said strip is fed and which cooperates to deform said strip into said convolutions,
  a. each of said assemblies including a plurality of wheels engaged with the corrugations of said strip and the convolutions formed therefrom,
  b. structure mounting said wheels for adjustable engagement with said corrugations, and
  c. connectors maintaining adjacent wheel-mounting structures interconnected for adjustable reorientation thereof in unison, and
 2. means engaged with said roll assemblies which is responsive to a change in the feed angle of said strip to said station to automatically change the orientation of the wheels of said assemblies in proportion to the change of said feed angle.

13. The apparatus of claim 12 in which said means engaged with said roll assemblies comprises:
A. an apertured supporting plate,
B. a slotted arm which is movable in response to a change in the feed angle of said strip,
C. cam follower structures operatively engaged with said slotted arm, and
D. connecting-pin structures extending through the apertures of said plate and interposed between said cam follower structures and the mounting structures for the wheels of said roll assemblies,
E. movement of said slotted arm effecting corresponding movement of said cam follower structures to produce attendant movement of the wheels of said roll assemblies.